(12) United States Patent
Kagose et al.

(10) Patent No.: US 9,056,986 B2
(45) Date of Patent: Jun. 16, 2015

(54) ULTRAVIOLET CURABLE TYPE INK-JET INK COMPOSITION, RECORDING METHOD AND RECORDING APPARATUS USING SAME

(75) Inventors: Taketoshi Kagose, Shiojiri (JP); Hiroki Nakane, Matsumoto (JP); Chigusa Sato, Shiojiri (JP); Hiroaki Kida, Shiojiri (JP); Toru Saito, Yamagaramu (JP)

(73) Assignee: Seiko Epson Corporation, Suwa-shi (JP)

(*) Notice: Subject to any disclaimer, the term of this patent is extended or adjusted under 35 U.S.C. 154(b) by 753 days.

(21) Appl. No.: 13/292,219

(22) Filed: Nov. 9, 2011

(65) Prior Publication Data

US 2012/0113201 A1 May 10, 2012

(30) Foreign Application Priority Data

| Nov. 9, 2010 | (JP) | 2010-251004 |
| Nov. 22, 2010 | (JP) | 2010-260050 |
| Feb. 9, 2011 | (JP) | 2011-025920 |
| Sep. 22, 2011 | (JP) | 2011-207187 |

(51) Int. Cl.
| B41J 2/01 | (2006.01) |
| C09D 4/00 | (2006.01) |
| B41J 2/21 | (2006.01) |
| C09D 11/101 | (2014.01) |
| C09D 11/322 | (2014.01) |

(52) U.S. Cl.
CPC .......... C09D 4/00 (2013.01); B41J 2/2107 (2013.01); C09D 11/101 (2013.01); C09D 11/322 (2013.01)

(58) Field of Classification Search
CPC .......... B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00

USPC .......... 347/100, 102, 101, 95, 96, 20, 21, 9, 347/88, 99; 523/160, 161; 106/31.6, 31.13, 106/31.27

See application file for complete search history.

(56) References Cited

U.S. PATENT DOCUMENTS

| 2009/0000508 A1 | 1/2009 | Edison et al. | |
| 2009/0099277 A1* | 4/2009 | Nagvekar et al. | 522/153 |
| 2009/0197988 A1* | 8/2009 | Kito et al. | 522/26 |
| 2009/0280302 A1* | 11/2009 | Fukumoto et al. | 347/100 |
| 2010/0313782 A1* | 12/2010 | Loccufier et al. | 101/483 |

FOREIGN PATENT DOCUMENTS

| JP | 2004-067991 A | 3/2004 |
| JP | 2004-224841 A | 8/2004 |
| JP | 2008-507598 A | 3/2008 |
| JP | 2009-057548 A | 3/2009 |
| JP | 2009-073945 A | 4/2009 |
| JP | 2009-096910 A | 5/2009 |

* cited by examiner

*Primary Examiner* — Manish S Shah
(74) *Attorney, Agent, or Firm* — Nutter McClennen & Fish LLP; John J. Penny, Jr.

(57) ABSTRACT

Provided is a UV curable type ink-jet ink composition containing a monomer A which is expressed by the following general formula (I):

$$CH_2=CR^1-COOR^2-O-CH=CH-R^3 \quad (I)$$

(in the formula, $R^1$ is a hydrogen atom or methyl radical, $R^2$ is a bivalent organic residue radical having a carbon number in a range of 2 to 20, and $R^3$ is a hydrogen atom or a univalent organic residue radical having a carbon number in a range of 1 to 11), a compound B containing five or more (meth)acryloyl radicals per molecule, and a monofunctional (meth)acrylate C having an aromatic ring skeleton, wherein the monofunctional (meth)acrylate C which is in a range of 5 to 35 wt % with respect to the total weight of the ink composition is contained, wherein the compound B is in a range of 5 to 40 wt % with respect to the total weight of the ink composition, wherein the monomer A is in a range of 10 to 70 wt % with respect to the total weight of the ink composition.

15 Claims, No Drawings

ULTRAVIOLET CURABLE TYPE INK-JET INK COMPOSITION, RECORDING METHOD AND RECORDING APPARATUS USING SAME

CROSS REFERENCES TO RELATED APPLICATIONS

The entire disclosure of Japanese Patent Application No.: 2011-025920, filed Feb. 9, 2011 and 2010-251004, filed Nov. 9, 2010 and 2011-207187, filed Sep. 22, 2011 and 2010-260050, filed Nov. 22, 2010 are expressly incorporated by reference herein.

BACKGROUND

1. Technical Field

The present invention relates to a UV curable type ink-jet ink composition and a recording method and a recording apparatus using the same.

2. Related Art

In the related art, various types of a recording method of forming an image on a recording medium such as paper based on image data signals have been used. Among the methods, in an ink jet type recording method, since the image is directly formed on the recording medium by ejecting ink on only necessary portions by using an inexpensive apparatus, the ink may be effectively used, and a running cost is low. In addition, since noise in the ink jet type recording method is small, the ink jet type recording method is a good recording method.

Recently, in order to form print with excellent water resistance, solvent resistance, abrasion resistance, and the like on the surface of the recording medium, in the ink jet type recording method, a UV curable type ink-jet ink composition which is cured through illumination of an ultraviolet rays has been used.

For example, JP-A-2009-96910 discloses a UV curable type ink-jet ink composition containing a polymerizable monomer made from one or more species selected from a group consisting of pentaerythritol tetraacrylate, dipentaerythritol hexa acrylate, or caprolactone modified (tris acryloxyethyl) isocyanurate, diethylene glycol mono vinylether acrylate, isobornyl acrylate, tetraethylene glycol diacrylate, N-vinylpyrrolidone, triethylene glycol divinylether, and ε-vinylcaprolactam, a predetermined coloring agent, and a photopolymerization initiator.

In addition, in the related art, various types of a recording method of forming an image on a recording medium such as paper based on image data signals have been used. Among the methods, in an ink jet type recording method, since the image is directly formed on the recording medium by ejecting ink on only necessary portions by using an inexpensive apparatus, the ink may be effectively used, and running cost is low. In addition, since noise in the ink jet type recording method is small, the ink jet type recording method is a good recording method.

Recently, in the ink jet type recording method, a UV curable type ink composition which is cured through illumination of an ultraviolet rays has been used as an ink composition which may provide good water resistance, solvent resistance, and abrasion resistance.

For example, Japanese Patent Nos. 4204333 and 3461501 disclose an active energy beam curable type ink jet printing ink containing a polymerizable monomer such as (meth) acrylic acid 2-(vinyloxyethoxy) ethyl and a photopolymerization initiator such as α-amino alkyl phenone.

In addition, JP-A-2009-57548 discloses a light curable type ink composition containing a resin-type polymer, a polymerizable monomer such as (meth)acrylic acid 2-(vinyloxyethoxy) ethyl, and a photopolymerization initiator such as an acylphosphine oxide.

However, in the case where a cured film is manufactured by using the UV curable type ink-jet ink composition disclosed in JP-A-2009-96910, the following problems occur. First, with respect to a thin film, in the case of a radical polymerization reaction system, due to the influence of oxygen inhibition, the curability deteriorates. Therefore, an additional film is necessarily formed to be thick so that the oxygen inhibition does not occur at the time of printing, and thus, there is a problem in that a quality of a printed image deteriorates. On the other hand, particularly, with respect to black ink or yellow ink, in the case of a thick film, a pigment has a strong tendency to absorb a portion of an active radiation (particularly, UV region), and thus, although the active radiation is illuminated, the energy necessary for completely curing a coated film ejected on a recording medium may be insufficient. Therefore, in some cases, only a near surface portion of the coated film is cured but an inner portion of the coated film is incompletely cured, or a relatively curing time is necessarily taken. Before a non-cured ink composition existing in an inner portion of the coated film is cured, if the non-cured ink composition flows irregularly, wrinkling occurs on the surface of the film. Due to the wrinkling, there is a problem in that a film characteristic of a thick film portion deteriorates.

SUMMARY

An advantage of some aspects of the invention is to provide a UV curable type ink-jet ink composition of which the curability is excellent with respect to both of a thin cured film and a thick cured film.

In addition, in the case where ink disclosed in Japanese Patent Nos. 4204333 and 3461501 is cured through illumination of an ultraviolet rays having a light emitting peak in an area (350 to 400 nm) near visible rays of light, there are problems in curability and abrasion resistance and a degree of initial coloration of a cured film.

In addition, in the case where an ink composition disclosed in JP-A-2009-57548 is cured through illumination of an ultraviolet rays having a light emitting peak in an area near visible rays of light, there are point to be improved in a curability and abrasion resistance and a degree of initial coloration of a cured film.

Another advantage of some aspects of the invention is to provide a UV curable type ink composition which has a low degree of initial coloration, excellent curability of ink, and excellent abrasion resistance of a cured film and a recording method using the UV curable type ink composition.

The inventors have researched intensively in order to solve the problem described above. As a result, it was found that the above problems may be solved by a UV curable type ink-jet ink composition containing a predetermined amount of specified monomer and a compound containing five or more (meth)acryloyl radicals per molecule, and thus the invention has been achieved.

In other words, the first invention is as follows.

[1] A UV curable type ink-jet ink composition containing a monomer A which is expressed by the following general formula (I):

$$CH_2=CR^1—COOR^2—O—CH=CH—R^3 \qquad (I)$$

(in the formula, $R^1$ is a hydrogen atom or methyl radical, $R^2$ is a bivalent organic residue radical having a carbon number in a range of 2 to 20, and $R^3$ is a hydrogen atom or a univalent organic residue radical having a carbon number in a range of 1 to 11), a compound B containing five or more (meth)acryloyl radicals per molecule, and a monofunctional (meth)acrylate C having an aromatic ring skeleton, wherein the monofunctional (meth)acrylate C which is in a range of 5 to 35 wt % with respect to the total weight of the ink composition is contained.

[2] In the UV curable type ink-jet ink composition according to [1], the monomer A is (meth)acrylic acid 2-(vinyloxyethoxy) ethyl.

[3] In the UV curable type ink-jet ink composition according to [1] or [2], the compound B contains at least one of a hexa (meth)acrylate compound having six (meth)acryloyl radicals per molecule and a penta(meth)acrylate compound having five (meth)acryloyl radicals per molecule.

[4] In the UV curable type ink-jet ink composition according to any one of [1] to [3], the compound B contains (meth)acrylate having a dipentaerythritol skeleton.

[5] In the UV curable type ink-jet ink composition according to [3], the compound B contains a dipentaerythritol hexa (meth)acrylate or a dipentaerythritol penta (meth)acrylate.

[6] In the UV curable type ink-jet ink composition according to [1], the compound B is in a range of 5 to 40 wt % with respect to the total weight of the ink composition.

[7] In the UV curable type ink-jet ink composition according to any one of [1] to [6], the monofunctional (meth)acrylate C having an aromatic ring skeleton is at least one of benzyl (meth)acrylate and phenoxyethyl (meth)acrylate.

[8] In the UV curable type ink-jet ink composition according to any one of [1] to [7], an acylphosphine oxide compound is contained as the photopolymerization initiator.

[9] In the UV curable type ink-jet ink composition according to [8], the acylphosphine oxide compound which is in a range of 7 to 15 wt % with respect to the total weight of the ink composition is contained as the photopolymerization initiator.

[10] In the UV curable type ink-jet ink composition according to any one of [1] to [9], the curing is performed through illumination of ultraviolet rays of which the light emitting peak wavelength is in a range of 350 to 420 nm with an illumination energy of equal to less than 300 mJ/cm$^2$.

[11] In the UV curable type ink-jet ink composition according to any one of [1] to [10], viscosity at 20° C. is in a range of 3 to 30 mPa·s.

[12] In the UV curable type ink-jet ink composition according to any one of [1] to [11], the curing is performed in a state of a thin film having a thickness of 0.5 to 3 μm.

[13] An ink jet recording method of ejecting the UV curable type ink-jet ink composition of any one of [1] to [12] on a recording medium and curing the ejected UV curable type ink-jet ink composition through illumination using a UV-LED of which the light emitting peak wavelength is in a range of 350 to 420 nm.

[14] An ink jet recording apparatus for ejecting the UV curable type ink-jet ink composition of any one of [1] to [12] on a recording medium and curing the ejected UV curable type ink-jet ink composition through illumination using a UV-LED of which the light emitting peak wavelength is in a range of 350 to 420 nm.

In addition, the inventors have researched intensively in order to solve the problem described above. As a result, it was found that the above problems may be solved by a UV curable type ink composition containing a polymerizable compound and a photopolymerization initiator, wherein the polymerizable compound contains a predetermined amount of acrylic acid 2-(vinyloxyethoxy) ethyl and the photopolymerization initiator contains a predetermined amount of an acylphosphine oxide, and wherein the acylphosphine oxide contains a mono acylphosphine oxide, so that the invention has been achieved.

In other words, the second invention is as follows.

[1] A UV curable type ink composition containing a polymerizable compound and a photopolymerization initiator, wherein the polymerizable compound contains a monomer A which is in a range of 40 to 90 wt % with respect to the total amount of the ink composition and expressed by the following general formula (I):

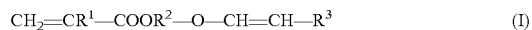

$$CH_2=CR^1-COOR^2-O-CH=CH-R^3 \qquad (I)$$

(in the formula, $R^1$ is a hydrogen atom or methyl radical, $R^2$ is a bivalent organic residue radical having a carbon number in a range of 2 to 20, and $R^3$ is a hydrogen atom or a univalent organic residue radical having a carbon number in a range of 1 to 11), and wherein the photopolymerization initiator contains an acylphosphine oxide which is in a range of 7 to 12 wt % with respect to the total amount of the ink composition, and the acylphosphine oxide contains at least a mono acylphosphine oxide.

[2] In the UV curable type ink composition according to [1], the monomer A is acrylic acid 2-(vinyloxyethoxy) ethyl.

[3] In the UV curable type ink composition according to [1] or [2], the photopolymerization initiator further contains a thioxanthone compound which is in a range of 0.5 to 5 wt % with respect to the total amount of the ink composition.

[4] In the UV curable type ink composition according to [3], the thioxanthone compound is 2,4-diethyl thioxanthone.

[5] In the UV curable type ink composition according to any one of [1] to [4], the acylphosphine oxide contains a mono acylphosphine oxide or contains a mono acylphosphine oxide and a bisacylphosphine oxide.

[6] In the UV curable type ink composition according to any one of [1] to [5], the curing may be performed through illumination of ultraviolet rays of which the light emitting peak wavelength is in a range of 350 to 400 nm with an illumination energy of less than 300 mJ/cm$^2$.

[7] In the UV curable type ink composition according to any one of [1] to [6], a phenoxyethyl (meth)acrylate which is in a range of 10 to 50 wt % with respect to the total amount of the ink composition is contained as the polymerizable compound.

[8] In the UV curable type ink composition according to any one of [1] to [7], the mono acylphosphine oxide which is in a range of equal to or more than 1 wt % with respect to the total amount of the ink composition is contained.

[9] A recording method using the UV curable type ink composition according to any one of [1] to [8], wherein the UV curable type ink composition is attached on a recording medium, and the attached UV curable type ink composition is illuminated with ultraviolet rays of which the light emitting peak wavelength is in a range of 350 to 400 nm with an illumination energy of less than 300 mJ/cm$^2$ by using a light emitting diode.

DESCRIPTION OF EXEMPLARY EMBODIMENTS

Hereinafter, an embodiment for embodying a first invention will be described in detail. In addition, the invention is not limited to the embodiments described hereinafter, and various modifications may be embodied within the scope of the invention.

In the specification, a "(meth)acrylate" denotes at least one of acrylates and corresponding methacrylates; a "(meth)

acryl" denotes at least one of acryls and corresponding methacryls; and a "(meth)acryloyl" denotes acryloyls and corresponding methacryloyls.

In the specification, a "curability" denotes a property where polymerization curing is completed through light illumination in the presence or absence of a photopolymerization initiator.

UV Curable Type Ink-Jet Ink Composition

An embodiment of the invention relates to a UV curable type ink-jet ink composition. The UV curable type ink-jet ink composition contains a (meth)acrylic acid ester (hereinafter, referred to as a "monomer A") containing a predetermined amount of vinylether radicals which is expressed by the following general formula (I):

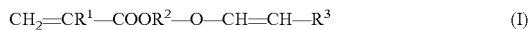
$$CH_2=CR^1-COOR^2-O-CH=CH-R^3 \qquad (I)$$

(in the formula, $R^1$ is a hydrogen atom or methyl radical, $R^2$ is a bivalent organic residue radical having a carbon number in a range of 2 to 20, and $R^3$ is a hydrogen atom or a univalent organic residue radical having a carbon number in a range of 1 to 11), a compound (hereinafter, referred to as a "compound B") containing five or more (meth)acryloyl radicals per molecule, and a monofunctional (meth)acrylate C having an aromatic ring skeleton.

Hereinafter, additive agents (constituents) which are contained or may be contained in a UV curable type ink-jet ink composition (hereinafter, simply referred to as an "ink composition") according to the embodiment will be described.

Polymerizable Compound

A polymerizable compound contained in the ink composition according to the embodiment is polymerized due to an operation of a photopolymerization initiator described later during a light illumination period so as to allow printed ink to be cured.

1. Monomer A

As a necessary polymerizable compound in the embodiment, a monomer A is expressed by the aforementioned general formula (I). The ink composition contains the monomer A, so that the curability of the ink may become good.

In the aforementioned general formula (I), as the bivalent organic residue radical indicated by $R^2$ a straight-chain, branched, or cyclic alkylene radical having a carbon number in a range of 2 to 20, an alkylene radical having a carbon number in a range of 2 to 20 and having oxygen atoms in an ether bond and/or an ester bond in the structure, and a bivalent aromatic radical having a carbon number in a range of 6 to 11 and being allowed to be substituted are very appropriately used. Among the materials, an alkylene radical having a carbon number in a range of 2 to 6 such as an ethylene radical, an n-propylene radical, an isopropylene radical, and butylene radical and an alkylene radical having a carbon number in a range of 2 to 9 and having oxygen atoms in an ether bond in the structure such as an oxyethylene radical, an oxy-n-propylene radical, an oxyisopropylene radical, and oxybutylene radical are very appropriately used.

In the aforementioned general formula (I), as the univalent organic residue radical having a carbon number in a range of 1 to 11 and being indicated by $R^3$, a straight-chain, branched, or cyclic alkyl radical having a carbon number in a range of 1 to 10, and an aromatic radical having a carbon number in a range of 6 to 11 and being allowed to be substituted are very appropriately used. Among the materials, an alkyl radical having a carbon number in a range of 1 to 2 such as a methyl radical or an ethyl radical and an aromatic radical having a carbon number in a range of 6 to 8 such as a phenyl radical and a benzyl radical are very appropriately used.

In the case where the aforementioned organic residue radical is a radical being allowed to be substituted, the substituent radicals may be divided into radicals containing carbon atoms and radicals containing no carbon atom. First, in the case where the substituent radical is a radical containing carbon atoms, the carbon atoms are counted as the carbon number of the organic residue radical. The radical containing carbon atoms is not limited to the following materials, but it may include, for example, a carboxyl radical. In addition, the radical containing no carbon atom is not limited to the following materials, but it may include, for example, a hydroxyl radical and a halo radical.

A specific example of the aforementioned monomer A is not limited to the following materials, but it may include (meth)acrylic acid 2-vinyloxyethyl, (meth)acrylic acid 3-vinyloxypropyl, (meth)acrylic acid 1-methyl-2-vinyloxyethyl, (meth)acrylic acid 2-vinyloxypropyl, (meth)acrylic acid 4-vinyloxybutyl, (meth)acrylic acid 1-methyl-3-vinyloxypropyl, (meth)acrylic acid 1-vinyloxymethyl propyl, (meth)acrylic acid 2-methyl-3-vinyloxypropyl, (meth)acrylic acid 1,1'-dimethyl-2-vinyloxyethyl, (meth)acrylic acid 3-vinyloxybutyl, (meth)acrylic acid 1-methyl-2-vinyloxypropyl, (meth)acrylic acid 2-vinyloxybutyl, (meth)acrylic acid 4-vinyloxycyclohexyl, (meth)acrylic acid 6-vinyloxyhexyl, (meth)acrylic acid 4-vinyloxymethyl cyclohexylmethyl, (meth)acrylic acid 3-vinyloxymethyl cyclohexylmethyl, (meth)acrylic acid 2-vinyloxymethyl cyclohexylmethyl, (meth)acrylic acid p-vinyloxymethyl phenylmethyl, (meth)acrylic acid m-vinyloxymethyl phenylmethyl, (meth)acrylic acid o-vinyloxymethyl phenylmethyl, (meth)acrylic acid 2-(vinyloxyethoxy) ethyl, (meth)acrylic acid 2-(vinyloxyisopropoxy) ethyl, (meth)acrylic acid 2-(vinyloxyethoxy) propyl, (meth)acrylic acid 2-(vinyloxyethoxy) isopropyl, (meth)acrylic acid 2-(vinyloxyisopropoxy) propyl, (meth)acrylic acid 2-(vinyloxyisopropoxy) isopropyl, (meth)acrylic acid 2-(vinyloxyethoxyethoxy) ethyl, (meth)acrylic acid 2-(vinyloxyethoxyisopropoxy) ethyl, (meth)acrylic acid 2-(vinyloxyisopropoxyethoxy) ethyl, (meth)acrylic acid 2-(vinyloxyisopropoxyisopropoxy) ethyl, (meth)acrylic acid 2-(vinyloxyethoxyethoxy) propyl, (meth)acrylic acid 2-(vinyloxyethoxyisopropoxy) propyl, (meth)acrylic acid 2-(vinyloxyisopropoxyethoxy) propyl, (meth)acrylic acid 2-(vinyloxyisopropoxyisopropoxy) propyl, (meth)acrylic acid 2-(vinyloxyethoxyethoxy) isopropyl, (meth)acrylic acid 2-(vinyloxyethoxyisopropoxy) isopropyl, (meth)acrylic acid 2-(vinyloxyisopropoxyethoxy) isopropyl, (meth)acrylic acid 2-(vinyloxyisopropoxyisopropoxy) isopropyl, (meth)acrylic acid 2-(vinyloxyethoxyethoxyethoxy) ethyl, (meth)acrylic acid 2-(vinyloxyethoxyethoxyethoxyethoxy) ethyl, (meth)acrylic acid 2-(isoprophenoxyethoxy) ethyl, (meth)acrylic acid 2-(isoprophenoxyethoxyethoxy) ethyl, (meth)acrylic acid 2-(isoprophenoxyethoxyethoxyethoxy) ethyl, (meth)acrylic acid 2-(isoprophenoxyethoxyethoxyethoxyethoxy) ethyl, (meth)acrylic acid polyethylene glycol mono vinylether, and (meth)acrylic acid polypropylene glycol mono vinylether.

Among the aforementioned materials, in order to secure more excellent curability, (meth)acrylic acid 2-vinyloxyethyl, (meth)acrylic acid 3-vinyloxypropyl, (meth)acrylic acid 1-methyl-2-vinyloxyethyl, (meth)acrylic acid 2-vinyloxypropyl, (meth)acrylic acid 4-vinyloxybutyl, (meth)acrylic acid 4-vinyloxycyclohexyl, (meth)acrylic acid 5-vinyloxypentyl, (meth)acrylic acid 6-vinyloxyhexyl, (meth)acrylic acid 4-vinyloxymethyl cyclohexylmethyl, (meth)acrylic acid p-vinyloxymethyl phenylmethyl, (meth)acrylic acid 2-(vinyloxyethoxy) ethyl, (meth)acrylic acid 2-(vinyloxyethoxyethoxy) ethyl, (meth)acrylic acid 2-(vinyloxyethoxyethoxyethoxy) ethyl are preferred.

Among the materials, in order to secure low viscosity, high flashing point, and excellent curability, at least one of (meth) acrylic acid 2-(vinyloxyethoxy) ethyls, that is, acrylic acid 2-(vinyloxyethoxy) ethyl and methacrylic acid 2-(vinyloxyethoxy) ethyl is preferred, and the former is more preferred. The (meth)acrylic acid 2-(vinyloxyethoxy) ethyl may include (meth)acrylic acid 2-(2-vinyloxyethoxy) ethyl and (meth) acrylic acid 2-(1-vinyloxyethoxy) ethyl. The acrylic acid 2-(vinyloxyethoxy) ethyl may include acrylic acid 2-(2-vinyloxyethoxy) ethyl (hereinafter, referred to as a "VEER") and acrylic acid 2-(1-vinyloxyethoxy) ethyl.

With respect to the monomer A, one species may be individually used, or a combination of two or more species may be used.

The contained amount of the monomer A is not particularly limited with respect to the total weight of the ink composition (100 wt %), but it is preferably in a range of 10 to 75 wt %, more preferably in a range of 30 to 75 wt %, particularly preferably in a range of 40 to 75 wt %, furthermore preferably in a range of 50 to 70 wt %. If the contained amount is within this range, the curability of the thin cured film of which the thickness is a range of, for example, 0.5 to 3 µm may become very excellent.

The method of manufacturing the monomer A is not limited to the following materials, but it may include an esterization method (Manufacturing Method C) of a (meth)acrylic acid and a hydroxyl radical-containing vinylether, an esterization method (Manufacturing Method D) of a (meth)acrylic acid halide and a hydroxyl radical-containing vinylether, an esterization method (Manufacturing Method E) of a (meth) acrylic acid anhydride and a hydroxyl radical-containing vinylether, an ester exchanging method (Manufacturing Method F) of a (meth)acrylic acid ester and a hydroxyl radical-containing vinylether, an esterization method (Manufacturing Method G) of a (meth)acryl acid and a halogen-containing vinylether, an esterization method (Manufacturing Method H) of a (meth)acrylic acid alkaline (earth) metal salt and a halogen-containing vinylether, a vinylexchanging method (Manufacturing Method I) of a hydroxyl radical-containing (meth)acrylic acid ester and a carboxylic acid vinyl, and an ether exchanging method (Manufacturing Method J) of a hydroxyl radical-containing (meth)acrylic acid ester and an alkyl vinylether.

Among the materials, in order to further obtain a desired effect of the embodiment, the Manufacturing Method F is preferred.

2. Compound B

As a necessary polymerizable compound in the embodiment, the compound B contains 5 or more (meth)acryloyl radicals per molecule. In other words, the compound B is a 5-or-more-functional (meth)acrylate-based compound. In the ink composition according to the embodiment, the compound B together with the monomer A is contained as the polymerizable compound, so that the curability of the ink may become very good.

In addition, in order to secure more excellent curability, it is preferable that the compound B have a hydroxyl radical in the molecule.

The 5-functional (meth)acrylate is not limited to the following materials, but it may include at least one of, for example, sorbitol penta(meth)acrylate, dipentaerythritol penta(meth)acrylate, ditrimethylol propane penta(meth)acrylate, propionic acid modified dipentaerythritol penta(meth)acrylate, propionic acid modified tripentaerythritol penta(meth) acrylate, propionic acid modified tetrapentaerythritol penta (meth)acrylate, ethylene oxide (EO) adducts thereof, and propylene oxide (PO) adducts thereof.

The 6-functional (meth)acrylate is not limited to the following materials, but it may include at least one of, for example, sorbitol hexa (meth)acrylate, ditrimethylol propane hexa acrylate, dipentaerythritol hexa (meth)acrylate, tripentaerythritol hexa (meth)acrylate, alkylene oxide modified hexa (meth)acrylate of phosphazene, caprolactone modified dipentaerythritol hexa (meth)acrylate, propionic acid modified tripentaerythritol hexa (meth)acrylate, propionic acid modified tetrapentaerythritol hexa (meth)acrylate, EO adducts thereof, and PO adducts thereof.

The 7-or-more-functional (meth)acrylate is not limited to the following materials, but it may include at least one of, for example, tripentaerythritol hepta(meth)acrylate, propionic acid modified tripentaerythritol hepta(meth)acrylate, propionic acid modified tetrapentaerythritol hepta(meth)acrylate, tripentaerythritol octa(meth)acrylate, propionic acid modified tetrapentaerythritol octa(meth)acrylate, tetrapentaerythritol nona(meth)acrylate, propionic acid modified tetrapentaerythritol nona(meth)acrylate, tetrapentaerythritol deca(meth)acrylate, pentapentaerythritol undeca(meth)acrylate, pentapentaerythritol dodeca(meth)acrylate, EO adducts thereof, and PO adducts thereof.

It is preferable that the compound B contain at least one of a 6-functional (meth)acrylate, that is, a hexa (meth)acrylate compound having six (meth)acryloyl radicals per molecule and a 5-functional (meth)acrylate, that is, a penta(meth)acrylate compound having five (meth)acryloyl radicals per molecule. In this case, the viscosity of the ink becomes relatively low, and the curability of the ink becomes good.

In addition, it is preferable that the compound B contains a (meth)acrylate having a dipentaerythritol skeleton. In this case, the curability of the ink becomes very excellent. The (meth)acrylate having a dipentaerythritol skeleton may include dipentaerythritol hexa (meth)acrylate, dipentaerythritol penta(meth)acrylate, and the like.

The contained amount of the compound B is preferably in a range of 5 to 40 wt % with respect to the total weight of the ink composition (100 wt %). If the contained amount is within this range, the curability of the ink may become very excellent.

Among the materials, particularly, in the case where the compound B is dipentaerythritol hexa (meth)acrylate (more preferably dipentaerythritol hexa acrylate), the contained amount is preferably in a range of 5 to 30 wt % with respect to the total weight of the ink composition (100 wt %), more preferably in a range of 5 to 15 wt %. If the contained amount is within this range, in the case where the cured film is a thin film of which the thickness is in range of, for example, 0.5 to 3 µm, the curability is excellent, and the ink may be formed to have a low viscosity.

Among the materials, particularly, in the case where the compound B is dipentaerythritol penta(meth)acrylate (more preferably dipentaerythritol pentaacrylate), the contained amount is preferably in a range of 8 to 40 wt % with respect to the total weight of the ink composition (100 wt %), more preferably in a range of 8 to 20 wt %. If the contained amount is within this range, in the case where the cured film is a thin film of which the thickness is in range of, for example, 0.5 to 3 µm, the curability is excellent, and the ink may be formed to have a low viscosity.

With respect to the compound B, one species may be individually used, or a combination of two or more species may be used.

3. Monofunctional (Meth)Acrylate C Having Aromatic Ring Skeleton

As a necessary polymerizable compound in the embodiment, the monofunctional (meth)acrylate C has an aromatic ring skeleton. In the ink composition according to the embodiment, the monofunctional (meth)acrylate C having an aromatic ring skeleton together with the monomer A and the compound B is contained as the polymerizable compound, so that the solubility of the photopolymerization initiator may become good and the curability of the ink may become good.

The monofunctional (meth)acrylate having an aromatic ring skeleton may include, for example, benzyl (meth)acrylate, phenoxyethyl (meth)acrylate, 2-hydroxy-3-phenoxypropyl (meth)acrylate, phenoxydiethylene glycol (meth)acrylate, and the like.

As the monofunctional (meth)acrylate C having an aromatic ring skeleton, at least one of benzyl (meth)acrylate and phenoxyethyl (meth)acrylate is more preferred, and at least one of benzyl acrylate and phenoxyethyl acrylate is furthermore preferred. In this case, the viscosity of the ink becomes low, and the solubility of the initiator becomes good.

With respect to at least one of the monofunctional (meth)acrylates C having an aromatic ring skeleton contained in the ink composition, the contained amount is in the case where 5 to 35 wt % with respect to the total weight of the ink composition (100 wt %), preferably 5 to 30 in a range of wt %. If the contained amount is within this range, the solubility of the photopolymerization initiator becomes good, and the viscosity of the ink may become low while maintaining the curability in a good state.

With respect to the aforementioned the monofunctional (meth)acrylate C having an aromatic ring skeleton, one species may be individually used, or a combination of two or more species may be used.

Other Polymerizable Compounds

In the embodiment, the aforementioned other polymerizable compounds (hereinafter, referred to as "other polymerizable compounds") may be further contained. As other polymerizable compounds, various types of monofunctional, bifunctional, trifunctional, or higher multifunctional monomers and oligomers in the related art may be used. The monomer may include, for example, a (meth)acryl acid, unsaturated carboxylic acids such as itaconic acid, crotonic acid, isocrotonic acid, and maleic acid or salts thereof, esters, urethanes, amides and anhydrides thereof, acrylonitril, styrene, various types of unsaturated polyesters, unsaturated polyethers, unsaturated polyamides, and unsaturated urethanes. In addition, the oligomer may include, for example, an oligomer made from the aforementioned monomer such as a straight-chain acryl oligomer, an epoxy (meth)acrylate, an oxetane (meth)acrylate, an aliphatic urethane (meth)acrylate, an aromatic urethane (meth)acrylate, an polyester (meth)acrylate.

In addition, as another monofunctional monomer or multifunctional monomer, an N-vinylcompound may be contained. The N-vinylcompound may include N-vinylformamide, N-vinylcarbazole, N-vinylacetamide, N-vinylpyrrolidone, N-vinylcaprolactam, acryloyl morpholine, derivatives thereof, and the like.

Hereinafter, among other polymerizable compounds, specific examples of a tetrafunctional or lower (meth)acryl acid ester, that is, a tetrafunctional or lower (meth)acrylate will be described.

The monofunctional (meth)acrylate is not limited to the following materials, but it may include, for example, isoamyl (meth)acrylate, stearyl (meth)acrylate, lauryl (meth)acrylate, octyl (meth)acrylate, decyl (meth)acrylate, isomiristyl (meth)acrylate, isostearyl (meth)acrylate, 2-ethyl hexyl-diglycol (meth)acrylate, 2-hydroxybutyl (meth)acrylate, butoxy ethyl (meth)acrylate, ethoxydiethylene glycol (meth)acrylate, methoxydiethylene glycol (meth)acrylate, methoxy polyethylene glycol (meth)acrylate, methoxypropylene glycol (meth)acrylate, tetrahydrofurfuryl (meth)acrylate, isobornyl (meth)acrylate, 2-hydroxyethyl (meth)acrylate, 2-hydroxypropyl (meth)acrylate, lactone-modified flexible (meth)acrylate, t-butyl cyclohexyl (meth)acrylate, dicyclopentanyl (meth)acrylate, and dicyclopentenyl oxyethyl (meth)acrylate.

The bifunctional (meth)acrylate is not limited to the following materials, but it may include, for example, 1,6-hexane diol di(meth)acrylate, 1,10-decane diol di(meth)acrylate, neopentyl glycol di(meth)acrylate, 2,4-dimethyl-1,5-pentane diol di(meth)acrylate, butyl ethyl propane diol (meth)acrylate, ethoxylated cyclohexane methanoldi(meth)acrylate, polyethylene glycol di(meth)acrylate, oligoethylene glycol di(meth)acrylate, ethylene glycol di(meth)acrylate, 2-ethyl-2-butyl butane diol di(meth)acrylate, hydroxy pivalic acid neopentyl glycol di(meth)acrylate, EO (ethylene oxide) modified bisphenol A di(meth)acrylate, bisphenol F polyethoxy di(meth)acrylate, polypropylene glycol di(meth)acrylate, oligopropylene glycol di(meth)acrylate, 1,4-butane diol di(meth)acrylate, 2-ethyl-2-butyl propane diol di(meth)acrylate, 1,9-nonane di(meth)acrylate, propoxylated ethoxylated bisphenol A di(meth)acrylate, and tricyclodecane di(meth)acrylate.

The trifunctional (meth)acrylate is not limited to the following materials, but it may include, for example, trimethylol propane tri (meth)acrylate, trimethylol ethane tri (meth)acrylate, alkylene oxide modified tri (meth)acrylate of trimethylol propane, pentaerythritol tri (meth)acrylate, dipentaerythritol tri (meth)acrylate, trimethylol propane tri ((meth)acryloyl oxypropyl)ether, isocyanuric acid alkylene oxide modified tri (meth)acrylate, propionic acid dipentaerythritol tri (meth)acrylate, tri ((meth)acryloyl oxyethyl) isocyanurate, hydroxy pivalic aldehyde modified dimethylol propane tri (meth)acrylate, sorbitol tri (meth)acrylate, glyceryl propoxy tri (meth)acrylate, propoxylated trimethylol propane tri (meth)acrylate, ethoxylated glycerin triacrylate, and caprolactone modified trimethylol propane tri (meth)acrylate.

The tetrafunctional (meth)acrylate is not limited to the following materials, but it may include, for example, pentaerythritol tetra(meth)acrylate, sorbitol tetra(meth)acrylate, ditrimethylol propane tetra(meth)acrylate, propionic acid dipentaerythritol tetra(meth)acrylate, and ethoxylated pentaerythritol tetra(meth)acrylate.

In addition, among the other polymerizable compounds, the monofunctional (meth)acrylate may have one or more types of skeletons selected from a group consisting of an aromatic ring skeleton, a saturated alicyclic skeleton, and an unsaturated alicyclic skeleton. By allowing the other polymerizable compound to be the monofunctional (meth)acrylate having a skeleton, the viscosity of the ink composition may be lowered. The monofunctional (meth)acrylate having a saturated alicyclic skeleton may include, for example, isobornyl (meth)acrylate, t-butyl cyclohexyl (meth)acrylate and dicyclopentanyl (meth)acrylate. In addition, the monofunctional (meth)acrylate having an unsaturated alicyclic skeleton may include, for example, dicyclopentenyl oxyethyl (meth)acrylate.

With respect to the aforementioned other polymerizable compounds, one species may be individually used, or a combination of two or more species may be used.

In the case where the aforementioned other polymerizable compounds are contained, the contained amount is not limited, but it is in a range of equal to or more than 5 wt % with respect to the total weight of the ink composition (100 wt %), preferably in a range of 5 to 40 wt %.

Photopolymerization Initiator

The photopolymerization initiator contained in the ink composition according to the embodiment is used to perform printing by curing the ink existing on the surface of the recording medium by the photopolymerization through illumination of the ultraviolet rays. By using the ultraviolet rays (UV) as the illumination light, it is possible to obtain excellent stability and to suppress the cost of the light source lamp. Although a material which generates active species such as radicals or cations by the energy of the light (ultraviolet rays) to initiate the polymerization of the polymerizable compound may be used without limitation, a photoradical polymerization initiator or a photo-cation polymerization initiator may be used. Among them, the photoradical polymerization initiator may be preferably used.

The aforementioned photoradical polymerization initiator may include for example, aromatic ketones, acylphosphine oxide compounds, aromatic onium salt compounds, organic peroxides, thio compounds (thioxanthone compounds, compounds containing a thio phenyl radical, or the like), hexa alirubi imidazole compounds, ketoxime ester compounds, borate compounds, ajinium compounds, metallocene compounds, active ester compounds, compounds having a carbon halogen bond, and alkyl amine compounds.

Among the materials, particularly in order to secure good curability of the ink, at least one of an acylphosphine oxide compound and a thioxanthone compound is preferred, and the acylphosphine oxide compound and the thioxanthone compound are more preferred.

A specific example of the photoradical polymerization initiator may include acetophenone, acetophenone benzyl ketal, 1-hydroxycyclohexyl phenyl ketone, 2,2-dimethoxy-2-phenyl acetophenone, xanthone, fluorenone, benzaldehyde, fluorene, anthraquinone, triphenyl amine, carbazole, 3-methyl acetophenone, 4-chloro benzophenone, 4,4'-dimethoxy benzophenone, 4,4'-diamino benzophenone, Michler's ketone, benzoin propyl ether, benzoin ethyl ether, benzyl dimethyl ketal, 1-(4-isopropyl phenyl)-2-hydroxy-2-methyl propane-1-one, 2-hydroxy-2-methyl-1-phenyl propane-1-one, thioxanthone, diethyl thioxanthone, 2-isopropyl thioxanthone, 2-chloro thioxanthone, 2-methyl-1-[4-(methyl thio)phenyl]-2-morpholino propane 1-one, bis(2,4,6-trimethyl benzoyl) phenyl phosphine oxide, 2,4,6-trimethyl benzoyl-diphenyl-phosphine oxide, 2,4-diethyl thioxanthone, and bis-(2,6-dimethoxybenzoyl)-2,4,4-trimethyl pentyl phosphine oxide.

Among the materials, the 2,4,6-trimethyl benzoyl-diphenyl-phosphine oxide, the bis(2,4,6-trimethyl benzoyl) phenyl phosphine oxide, and the 2,4-diethyl thioxanthone are very appropriately used.

A commercialized product of the photoradical polymerization initiator may include, for example, IRGACURE 651 (2,2-dimethoxy-1,2-diphenyl ethane-1-one), IRGACURE 184 (1-hydroxy-cyclohexyl-phenyl-ketone), DAROCUR 1173 (2-hydroxy-2-methyl-1-phenyl-propane-1-one), IRGACURE 2959 (1-[4-(2-hydroxyethoxy)phenyl]-2-hydroxy-2-methyl-1-propane-1-one), IRGACURE 127 (2-hydroxy-1-{4-[4-(2-hydroxy-2-methyl propionyl)-benzyl]phenyl}-2-methyl-propane-1-one}, IRGACURE 907 (2-methyl-1-(4-methyl thio phenyl)-2-morpholino propane 1-one), IRGACURE 369 (2-benzyl-2-dimethyl amino-1-(4-morpholino phenyl)-butanone1), IRGACURE 379 (2-(dimethyl amino)-2-[(4-methyl phenyl)methyl]-1-[4-(4-morpholinyl) phenyl]-1-butanone), DAROCUR TPO (2,4,6-trimethyl benzoyl-diphenyl-phosphine oxide), IRGACURE 819 (bis(2,4,6-trimethyl benzoyl)phenyl phosphine oxide), IRGACURE 784 (bis($\eta$5-2,4-cyclopentadiene-1-yl)-bis(2,6-difluoro-3-(1H-pyrrol 1-yl)phenyl)titanium), IRGACURE OXE 01 (1,2-octane dione, 1-[4-(phenyl thio)-, 2-(O-benzoyl oxime)]), IRGACURE OXE 02 (ethanone, 1-[9-ethyl-6-(2-methyl benzoyl)-9H-carbazole 3-yl]-, 1-(O-acetyl oxime)), IRGACURE 754 (a mixture of oxyphenyl acetic acid, 2-[2-oxo-2-phenyl acetoxyethoxy]ethyl ester and oxyphenyl acetic acid, 2-(2-hydroxyethoxy)ethyl ester) (trade names of products manufactured by BASF), KAYACURE DETX-S (2,4-diethyl thioxanthone) (trade name of product manufactured by NIPPON KAYAKU CO., LTD.), Lucirin TPO, LR8893, LR8970 (trade names of products manufactured by BASF), Uvecryl P36 (trade name of product manufactured by UCB), and the like.

With respect to the photopolymerization initiator, one species may be individually used, or a combination of two or more species may be used.

With respect to the photopolymerization initiator, in order to secure good curability of the ink and to prevent the melt remaining of the photopolymerization initiator or the coloring derived from the photopolymerization initiator, the contained amount thereof is preferably in a range of 1 to 20 wt % with respect to the total weight of the ink composition (100 wt %).

In addition, although addition of the photopolymerization initiator may be omitted by using a photopolymerizable compound as the aforementioned polymerizable compound, the photopolymerization initiator is very preferably used since the initiation of the polymerization may be easily adjusted.

In addition, in the case where the photopolymerization initiator contains an acylphosphine oxide compound, the contained amount thereof is preferably in a range of 7 to 15 wt % with respect to the total weight of the ink composition (100 wt %), more preferably in a range of 8 to 14%, particularly preferably in a range of 9 to 13%. If the contained amount is within this range, the curability of the ink composition may become more excellent, and the solubility to the ink composition may become good.

In addition, in the cased where the photopolymerization initiator contains a thioxanthone compound, the contained amount thereof is preferably in a range of 0.5 to 4 wt % with respect to the total weight of the ink composition (100 wt %), more preferably in a range of 1 to 3 wt %. If the contained amount is within this range, the curability of the ink composition may become more excellent.

Coloring Material

The ink composition according to the embodiment may further contain a coloring material. With respect to the coloring material, at least one of a pigment and a dye may be used.

Pigment

In the embodiment, a pigment may be used as the coloring material, so that it is possible to improve the light resistance of the ink composition. With respect the pigment, both of an inorganic pigment and an organic pigment may be used.

As the inorganic pigment, carbon black (C. I. Pigment Black 7) such as a furnace black, a lamp black, an acetylene black, and a channel black, iron oxide, and titanium oxide may be used.

The organic pigment may include azo pigments such as insoluble azo pigments, condensed azo pigments, azoreki, and chelate azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates (for example, basic dye type chelates, acidic dye type chelates, or the like), stained lakes (basic dye type lakes and acidic dye type lakes), nitro pigments, nitroso pigments, aniline blacks, and daylight fluorescent pigments.

More specifically, the carbon black used as the black ink may include No. 2300, No. 900, MCF88, No. 33, No. 40, No. 45, No. 52, MA7, MA8, MA100, No. 2200B, and the like (trade names of products manufactured by MITSUBISHI CHEMICAL CORPORATION), Raven 5750, Raven 5250, Raven 5000, Raven 3500, Raven 1255, Raven 700, and the like (trade names of products manufactured by CARBON COLUMBIA), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (trade names of products manufactured by CABOT JAPAN K.K.), and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, and the like (trade names of products manufactured by DEGUSSA).

The pigment used as the white ink may include C. I. Pigment White 6, 18, 21.

The pigment used as the yellow ink may include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, 180.

The pigment used as the magenta ink may include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, and C. I. Pigment Violet 19, 23, 32, 33, 36, 38, 43, 50.

The pigment used as the cyan ink may include C. I. Pigment Blue 1, 2, 3, 15, 15:1, 15:2, 15:3, 15:34, 15:4, 16, 18, 22, 25, 60, 65, 66, and C. I. Vat Blue 4, 60.

In addition, the pigment excluding the magenta, cyan, and yellow pigments may include, for example, C. I. Pigment Green 7, 10, C. I. Pigment Brown 3, 5, 25, 26, and C. I. Pigment Orange 1, 2, 5, 7, 13, 14, 15, 16, 24, 34, 36, 38, 40, 43, 63.

With respect to the pigment, one species may be individually used, or two or more species may be simultaneously used.

In the case where the aforementioned pigment is used, the average particle diameter is preferably equal to or less than 300 nm, more preferably in a range of 50 to 200 nm. If the average particle diameter is within the aforementioned range, reliability such as ejection stability or dispersion stability of the ink composition may become more excellent, and an image having an excellent quality of image may be formed. Herein, in the specification, the average particle diameter is measured by a dynamic light scattering method.

Dye

In the embodiment, a dye may be used as the coloring material. The dye is not particularly limited, and an acidic dye, a direct dye, a reactive dye, and a basic dye may be used. The dye may include, for example, C. I. Acid Yellow 17, 23, 42, 44, 79, 142, C. I. Acid Red 52, 80, 82, 249, 254, 289, C. I. Acid Blue 9, 45, 249, C. I. Acid Black 1, 2, 24, 94, C. I. Food Black 1, 2, C. I. Direct Yellow 1, 12, 24, 33, 50, 55, 58, 86, 132, 142, 144, 173, C. I. Direct Red 1, 4, 9, 80, 81, 225, 227, C. I. Direct Blue 1, 2, 15, 71, 86, 87, 98, 165, 199, 202, C. I. Direct Black 19, 38, 51, 71, 154, 168, 171, 195, C. I. Reactive Red 14, 32, 55, 79, 249, and C. I. Reactive Black 3, 4, 35.

With respect to the dye, one species may be individually used, or two or more species may be simultaneously used.

In order to obtain an excellent obliterating property and color reproducibility, the contained amount of the coloring material is preferably in a range of 0.5 to 10 wt % with respect to the total weight of the ink composition (100 wt %).

Dispersing Agent

In the case where the ink composition according to the embodiment contains a pigment, in order to secure better pigment dispersibility, a dispersing agent may further contained. The dispersing agent is not particularly limited, but it may include, for example, a dispersing agent such as a macromolecular dispersing agent which is well used to manufacture a pigment dispersion liquid. A specific example may include one or more species of polyoxy alkylene polyalkylene polyamine, a vinyl-based polymer and a copolymer, an acryl-based polymer and a copolymer, a polyester, a polyamide, a polyimide, a poly urethane, an amino-based polymer, a silicon-containing polymer, an sulfur-containing polymer, a fluorine-containing polymer, and an epoxy resin as a main constituent. A commercialized product of the macromolecular dispersing agent may include Discoall series manufactured by DAI-ICHI KOGYO SEIYAKU CO., LTD., Solsperse series (Solsperse 36000 or the like) manufactured by LUBRIZOL CORPORATION, and Disperbyk series manufactured by BYK CHEMIE.

Slip Agent

In order to obtain excellent abrasion resistance, the ink composition according to the embodiment may further contain a slip agent (surfactant). The slip agent is not particularly limited. For example, as a silicon-based surfactant, a polyester modified silicon or a polyether modified silicon may be used. Particularly, it is preferable that a polyether modified polydimethyl siloxane or a polyester modified polydimethyl siloxane be used. A specific example may include BYK-347, BYK-348, BYK-UV3500, 3510, 3530, 3570 (manufactured by BYK JAPAN K.K.).

Polymerization Inhibitor

The ink composition according to the embodiment may further contain a polymerization inhibitor. By adding the polymerization inhibitor to the ink composition, the preservation stability of the ink composition is improved. The polymerization inhibitor is not particularly limited, but it may include, for example, at least one or more species selected from a group consisting of a phenol compound, a hydroquinone compound, and a quinine compound. A specific example of the polymerization inhibitor may include hydroquinone, p-methoxyphenol, cresol, t-butyl catechol, 3,5-di-t-butyl-4-hydroxy toluene, 2,2'-methylene bis(4-methyl-6-t-butyl phenol), 2,2'-methylene bis(4-ethyl-6-butyl phenol), 4,4'-thio bis(3-methyl-6-t-butyl phenol).

As a commercialized product of the polymerization inhibitor, IRGASTAB UV10 and UV22 (trade names of products manufactured by BASF) or the like may be used.

Other Additive Agents

The ink composition according to the embodiment may contain other additive agents (constituents) besides the additive agents described above. The constituents are not particularly limited and may include, for example a polymerization accelerator, a penetration enhancer, a wetting agent (humectant), and other additive agents which are well known in the related art. Other additive agents listed above may include, for example, a fixer, a fungicide, an antiseptic agent, an antioxidant, an ultraviolet ray absorber, a chelate agent, a pH adjuster, and a viscosity improver which are well known in the related art.

Recording Medium

A recording material may be obtained by ejecting the UV curable type ink-jet ink composition according to the embodiment on the recording medium by an ink jet recording method described later. The recording medium may include, for example, an absorptive recording medium or a non-absorptive recording medium. The ink jet recording method according to the embodiment may be applied to a variety of the recording media having various absorption performances ranging from a non-absorptive recording medium which may be easily penetrated by penetrate an aqueous ink composition thereto to an absorptive recording medium which may not be easily penetrated by an aqueous ink composition thereto. However, in the case where the ink composition is applied to the non-absorptive recording medium, a drying process may be necessarily provided after the curing through the illumination of the ultraviolet rays.

The absorptive recording medium is not particularly limited, but it may include, for example, a plain paper such an electro-photographic paper having a high permeability of aqueous ink, ink jet paper (ink jet dedicated paper having an ink absorption layer made from silica particles or aluminum particles or an ink absorption layer made from a hydrophilic polymer such as polyvinylalcohol (PVA) or polyvinylpyrrolidone (PVP)), art paper used for general offset printing having a relatively low permeability of aqueous ink, coat paper, cast paper, and the like.

The non-absorptive recording medium is not particularly limited, but it may include, for example, a plastic film or plate such as polyvinyl, chloride, polyethylene, polypropylene, and polyethylene terephthalate (PET), a metal plate such as iron, silver, copper, and aluminum, a metal plate or a plastic film produced by depositing various metals, an alloy plate such as stainless steel or brass, or the like.

Ink Jet Recording Method

The UV curable type ink-jet ink composition according to the embodiment may be used for an ink jet recording method. The ink jet recording method includes an ejection process for ejecting an ink composition on a recording medium and a curing process for curing the ink composition by illuminating the ink composition ejected by the ejection process with an ultraviolet rays. In this manner, a coated film (cured film) is formed with the ink composition cured on the recording medium.

Ejection Process

In the ejection process, an ink jet recording apparatus in the related art may be used. In order to secure good ejection stability at the time of ejecting the ink composition, the viscosity of the ink composition at 20° C. is preferably in a range of 3 to 30 mPa·s, more preferably in a range of 5 to 15 mPa·s.

Since the viscosity of the UV curable type ink-jet ink composition according to the embodiment is higher than that of an aqueous ink composition which is used as a general ink-jet ink, the viscosity is greatly changed according to a change in temperature at the time of ejection. The change in viscosity of the ink has much influence on a change in size of liquid droplets and a change in ejection rate of liquid droplets, and furthermore, it may lead to deterioration in quality of image. Therefore, it is preferable that the temperature of the ink at the time of ejection is maintained as constant as possible.

Curing Process

Next, in the curing process, the ink composition ejected on the recording medium is cured through illumination of the ultraviolet rays (light). This is because the photopolymerization initiator contained in the ink composition is dissolved through illumination of the ultraviolet rays to generate initiating species such as radicals, acids, and bases and the polymerization reaction of the photopolymerizable compound is prompted by the function of the initiating species. Otherwise, this is because the polymerization reaction of the photopolymerizable compound is initiated though the illumination of the ultraviolet rays. At this time, if a sensitizing dye together with the photopolymerization initiator exist in the ink composition, the sensitizing dye in the system absorbs the ultraviolet rays to be in the excited state, and the dissolution of the photopolymerization initiator is precipitated by allowing the sensitizing dye to be in contact with the photopolymerization initiator, so that it is possible to achieve the more sensitive curing reaction.

As an ultraviolet ray source, a mercury lamp, a gas-solid laser, and the like are mainly used. As a light source used for the curing of the UV curable type ink-jet ink composition, a mercury lamp and an a metal halide lamp are widely known. On the other hand, currently, mercury-free sources are greatly preferred in terms of environmental protection, and replacement with a GaN-based semiconductor ultra violet light emitting device is very useful from industrial and environmental points of view. In addition, the ultraviolet ray light emitting diode (UV-LED) and the ultraviolet ray laser diode (UV-LD) has a small size, a long lifetime, and a high efficiency and is inexpensive, and thus, the sources are expected to be used as a UV curable type ink jet light source. Among the sources, the UV-LED is preferred.

Herein, it is preferable that a UV curable type ink-jet ink composition which may be cured through illumination of ultraviolet rays of which the light emitting peak wavelength is preferably in a range of 350 to 420 nm, more preferably in a range of 365 to 405 nm with an illumination energy which is preferably in a range of equal to or less than 300 mJ/cm$^2$, more preferably in a range of 100 to 250 mJ/cm$^2$ be used. In this case, due to the composition of the ink composition according to the embodiment, the curing may be performed at a low energy and at a high rate. The illumination energy is calculated as a product of an illumination time and an illumination intensity. The illumination time may be reduced according to the composition of the ink composition according to the embodiment, and in this case, the printing speed is increased. On the other hand, the illumination intensity may be decreased according to the composition of the ink composition according to the embodiment, and in this case, a small-sized apparatus and cost reduction may be implemented. In this case, the UV-LED is preferably used for the ultraviolet ray illumination. Such an ink composition may be obtained by containing a polymerizable compound of which the polymerization is initiated through the ultraviolet ray illumination in the wavelength range and a photopolymerization initiator which is dissolved through the ultraviolet ray illumination in the wavelength range.

In addition, it is preferable that a UV curable type ink-jet ink composition which may be cured in the state of a thin film of which the thickness is preferably in a range of 0.5 to 3 µm, more preferably in a range of 0.8 to 2.5 µm be used. In this case, due to the composition of the ink composition according to the embodiment, an image may be formed in a thin film, so that it is possible to obtain advantageous effect in that a swelling appearance of the coated film is reduced. The ink composition may be obtained by using various methods described above.

In this manner, according to the embodiment, in both of a thin (for example, the thickness is in a range of 0.5 to 3 µm) cured film and a thick (for example, the thickness is in a range of equal to more than 10 µm) cured film, it is possible to provide a UV curable type ink-jet ink composition having excellent curability. More specifically, with respect to a thin film of which the thickness is in a range of, for example, 0.5 to 3 μm or dots of which the diameter is in a range of, for example, 0.5 to 3 μm, the curability is improved. Therefore, the printing may be performed so that the smaller ink droplets are attached to the recording medium, and thus, the quality of image is improved. In addition, particularly with respect to the black ink or the yellow ink, the curability of the thick film (for example, the thickness is in a range of equal to or more 10 μm) is improved, so that it is possible to suppress the occurrence of wrinkling. Therefore, the characteristics of the coated film of the ink are improved.

Ink Jet Recording Apparatus

The UV curable type ink-jet ink composition according to the embodiment may be used for an ink jet recording apparatus. The ink jet recording apparatus performs recording by the aforementioned ejection process for ejecting an ink composition on a recording medium and the aforementioned curing process for curing the ink composition by illuminating the ink composition ejected by the ejection process with an ultraviolet rays. In this manner, the ink jet recording apparatus is a recording apparatus which forms a coated film (cured film) with the ink composition cured on the recording medium.

Hereinafter, an embodiment for embodying a second invention will be described in detail. In addition, the invention is not limited to the embodiments described hereinafter, and various modifications may be embodied within the scope of the invention.

In the specification, a "(meth)acrylate" denotes at least one of acrylates and corresponding methacrylates, and a "(meth)acryl" denotes at least one of acryls and corresponding methacryls.

In the specification, "curability" denotes a property where a material is cured through light sensitization. "Abrasion resistance" denotes a property where a cured film (image surface) of a recording material is hard to scratch. In addition, a degree of the abrasion resistance is proportional to a hardness of the cured film. "Color stability" a property where, as seen in a time sequence after printing, L*a*b* in CIE Lab (L*a*b* colorimetric system) is barely changed from L*a*b* just after the printing. "Ejection stability" denotes a property where ink droplets are always stably ejected from nozzles without clogging of the nozzles.

UV Curable Type Ink Composition

An embodiment of the invention relates to a UV curable type ink composition. The UV curable type ink composition contains a polymerizable compound and a photopolymerization initiator. The polymerizable compound contains a monomer A described later, which is in a range of 40 to 90 wt % with respect to the total amount of the ink composition. The photopolymerization initiator contains an acylphosphine oxide which is in a range of 7 to 12 wt % with respect to the total amount of the ink composition. The acylphosphine oxide contains a mono acylphosphine oxide.

Hereinafter, additive agents (constituents) which are contained or may be contained in the UV curable type ink composition (hereinafter, simply referred to as an "ink composition") according to the embodiment will be described.

Polymerizable Compound

The polymerizable compound contained in the ink composition according to the embodiment are polymerized due to the operation of the photopolymerization initiator described later during an ultraviolet ray illumination period, so that the printed ink may be cured.

Monomer A

As a necessary polymerizable compound in the embodiment, a monomer A is a vinylether radical-containing (meth) acrylic acid ester and is expressed by the following general formula (I).

$$CH_2=CR^1—COOR^2—O—CH=CH—R^3 \quad (I)$$

(in the formula, $R^1$ is a hydrogen atom or methyl radical, $R^2$ is a bivalent organic residue radical having a carbon number in a range of 2 to 20, and $R^3$ is a hydrogen atom or a univalent organic residue radical having a carbon number in a range of 1 to 11).

The ink composition contains the monomer A, so that the curability of the ink may become good.

In the aforementioned general formula (I), as the bivalent organic residue radical having a carbon number in a range of 2 to 20 and being indicated by $R^2$ a straight-chain, branched, or cyclic alkylene radical having a carbon number in a range of 2 to 20, an alkylene radical having a carbon number in a range of 2 to 20 and having oxygen atoms in an ether bond and/or an ester bond in the structure, and a bivalent aromatic radical having a carbon number in a range of 6 to 11 and being allowed to be substituted are very appropriately used. Among the materials, an alkylene radical having a carbon number in a range of 2 to 6 such as an ethylene radical, an n-propylene radical, an isopropylene radical, and a butylene radical, and an alkylene radical having a carbon number in a range of 2 to 9 and having oxygen atoms in an ether bond in the structure such as an oxyethylene radical, an oxy-n-propylene radical, an oxyisopropylene radical, and oxybutylene radical are very appropriately used.

In the aforementioned general formula (I), as the univalent organic residue radical having a carbon number in a range of 1 to 11 and being indicated by $R^3$, a straight-chain, branched, or cyclic alkyl radical, having 1 to 10 oxygen atoms, and an aromatic radical having 6 to 11 oxygen atoms and being allowed to be substituted are very appropriately used. Among the materials, an alkyl radical having a carbon number in a range of 1 to 2 such as a methyl radical or an ethyl radical and an aromatic radical having a carbon number in a range of 6 to 8 such as a phenyl radical and a benzyl radical are very appropriately used.

In the case where the aforementioned organic residue radical is a radical being allowed to be substituted, the substituent radicals may be divided into radicals containing carbon atoms and radicals containing no carbon atom. First, in the case where the substituent radical is a radical containing carbon atoms, the carbon atoms are counted as the carbon number of the organic residue radical. The radical containing carbon atoms is not limited to the following materials, but it may include, for example, a carboxyl radical, an alkoxy radical, and the like. In addition, the radical containing no carbon atom is not limited to the following materials, but it may include, for example, a hydroxyl radical and a halo radical.

The aforementioned monomer A is not limited to the following materials, but it may include, for example, (meth) acrylic acid 2-vinyloxyethyl, (meth)acrylic acid 3-vinyloxypropyl, (meth)acrylic acid 1-methyl-2-vinyloxyethyl, (meth)acrylic acid 2-vinyloxypropyl, (meth)acrylic acid 4-vinyloxybutyl, (meth)acrylic acid 1-methyl-3-vinyloxypropyl, (meth)acrylic acid 1-vinyloxymethyl propyl, (meth) acrylic acid 2-methyl-3-vinyloxypropyl, (meth)acrylic acid 1,1-dimethyl-2-vinyloxyethyl, (meth)acrylic acid 3-vinyloxybutyl, (meth)acrylic acid 1-methyl-2-vinyloxypropyl, (meth)acrylic acid 2-vinyloxybutyl, (meth)acrylic acid 4-vinyloxycyclohexyl, (meth)acrylic acid 6-vinyloxyhexyl, (meth)acrylic acid 4-vinyloxymethyl cyclohexylmethyl, (meth)acrylic acid 3-vinyloxymethyl cyclohexylmethyl, (meth)acrylic acid 2-vinyloxymethyl cyclohexylmethyl, (meth)acrylic acid p-vinyloxymethyl phenylmethyl, (meth)acrylic acid m-vinyloxymethyl phenylmethyl, (meth)acrylic acid o-vinyloxymethyl phenylmethyl, (meth)acrylic acid 2-(vinyloxyethoxy) ethyl, (meth)acrylic acid 2-(vinyloxyisopropoxy) ethyl, (meth)acrylic acid 2-(vinyloxyethoxy) propyl, (meth)acrylic acid 2-(vinyloxyethoxy) isopropyl, (meth)acrylic acid 2-(vinyloxyisopropoxy) propyl, (meth)acrylic acid 2-(vinyloxyisopropoxy) isopropyl, (meth)acrylic acid 2-(vinyloxyethoxyethoxy) ethyl, (meth)acrylic acid 2-(vinyloxyethoxyisopropoxy) ethyl, (meth)acrylic acid 2-(vinyloxyisopropoxyethoxy) ethyl, (meth)acrylic acid 2-(vinyloxyisopropoxyisopropoxy) ethyl, (meth)acrylic acid 2-(vinyloxyethoxyethoxy) propyl, (meth)acrylic acid 2-(vinyloxyethoxyisopropoxy) propyl, (meth)acrylic acid 2-(vinyloxyisopropoxyethoxy) propyl, (meth)acrylic acid 2-(vinyloxyisopropoxyisopropoxy) propyl, (meth)acrylic acid 2-(vinyloxyethoxyethoxy) isopropyl, (meth)acrylic acid 2-(vinyloxyethoxyisopropoxy) isopropyl, (meth)acrylic acid 2-(vinyloxyisopropoxyethoxy) isopropyl, (meth)acrylic acid 2-(vinyloxyisopropoxyisopropoxy) isopropyl, (meth)acrylic acid 2-(vinyloxyethoxyethoxyethoxy) ethyl, (meth)acrylic acid 2-(vinyloxyethoxyethoxyethoxyethoxy) ethyl, (meth)acrylic acid 2-(isoprophenoxyethoxy) ethyl, (meth)acrylic acid 2-(isoprophenoxyethoxyethoxy) ethyl, (meth)acrylic acid 2-(isoprophenoxyethoxyethoxyethoxy) ethyl, (meth)acrylic acid 2-(isoprophenoxyethoxyethoxyethoxyethoxy) ethyl, (meth)acrylic acid polyethylene glycol mono vinylether, and (meth)acrylic acid polypropylene glycol mono vinylether.

Among the materials, in order to secure low viscosity, high flashing point, and excellent curability, at least one of (meth)acrylic acid 2-(vinyloxyethoxy) ethyl, that is, acrylic acid 2-(vinyloxyethoxy) ethyl and methacrylic acid 2-(vinyloxyethoxy) ethyl is preferred, and acrylic acid 2-(vinyloxyethoxy) ethyl is further preferred. The (meth)acrylic acid 2-(vinyloxyethoxy) ethyl may include (meth)acrylic acid 2-(2-vinyloxyethoxy) ethyl and (meth)acrylic acid 2-(1-vinyloxyethoxy) ethyl. The acrylic acid 2-(vinyloxyethoxy) ethyl may include acrylic acid 2-(2-vinyloxyethoxy) ethyl and acrylic acid 2-(1-vinyloxyethoxy) ethyl. In addition, acrylic acid 2-(vinyloxyethoxy) ethyl is more excellent than methacrylic acid 2-(vinyloxyethoxy) ethyl in terms of the curability.

The contained amount of the monomer A is in a range of 40 to 90 wt % with respect to the total amount of the ink composition (100 wt %), preferably in a range of 60 to 90 wt %, and more preferably in a range of 60 to 80 wt %. If the contained amount is within this range, the curability of the ink and the abrasion resistance of the cured film become excellent.

The method of manufacturing the monomer A is not limited to the following materials, but it may include an esterization method (Manufacturing Method B) of a (meth)acrylic acid and a hydroxyl radical-containing vinylether, an esterization method (Manufacturing Method C) of a (meth)acrylic acid halide and a hydroxyl radical-containing vinylether, an esterization method (Manufacturing Method D) of a (meth)acrylic acid anhydride and a hydroxyl radical-containing vinylether, an ester exchanging method (Manufacturing Method E) of a (meth)acrylic acid ester and a hydroxyl radical-containing vinylether, an esterization method (Manufacturing Method F) of a (meth)acryl acid and a halogen-containing vinylether, an esterization method (Manufacturing Method G) of a (meth)acrylic acid alkaline (earth) metal salt and a halogen-containing vinylether, a vinylexchanging method (Manufacturing Method H) of a hydroxyl radical-containing (meth)acrylic acid ester and a carboxylic acid vinyl, and an ether exchanging method (Manufacturing Method I) of a hydroxyl radical-containing (meth)acrylic acid ester and an alkyl vinylether.

Among them, in order to further obtain a desired effect of the embodiment, the Manufacturing Method E is preferred.

Polymerizable Compounds Other than Monomer A

In addition, besides the aforementioned monomer A, various types of monofunctional, bifunctional, trifunctional, or higher multifunctional monomers and oligomers in the related art may be used (hereinafter, referred to as "other polymerizable compounds"). The monomer may include, for example, a (meth)acryl acid, unsaturated carboxylic acids such itaconic acid, crotonic acid, isocrotonic acid, and maleic acid or salts thereof, esters, urethanes, amides and anhydrides thereof, acrylonitril, styrene, various types of unsaturated polyesters, unsaturated polyethers, unsaturated polyamides, and unsaturated urethanes. In addition, the oligomer may include, for example, an oligomer made from the aforementioned monomer such as a straight-chain acryl oligomer, an epoxy (meth)acrylate, an oxetane (meth)acrylate, an aliphatic urethane (meth)acrylate, an aromatic urethane (meth)acrylate, an polyester (meth)acrylate.

In addition, as another monofunctional monomer or multifunctional monomer, an N-vinylcompound may be contained. The N-vinylcompound may include N-vinylformamide, N-vinylcarbazole, N-vinylacetamide, N-vinylpyrrolidone, N-vinylcaprolactam, acryloyl morpholine, derivatives thereof, and the like.

Among other polymerizable compounds, an ester of a (meth)acryl acid, this is, a (meth)acrylate is preferred.

Among the (meth)acrylates described above, the monofunctional (meth)acrylate may include, for example, isoamyl (meth)acrylate, stearyl (meth)acrylate, lauryl (meth)acrylate, octyl (meth)acrylate, decyl (meth)acrylate, isomiristyl (meth)acrylate, isostearyl (meth)acrylate, 2-ethyl hexyl diglycol (meth)acrylate, 2-hydroxybutyl (meth)acrylate, butoxy ethyl (meth)acrylate, ethoxydiethylene glycol (meth)acrylate, methoxydiethylene glycol (meth)acrylate, methoxy polyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone-modified flexible (meth)acrylate, t-butyl cyclohexyl (meth)acrylate, dicyclopentanyl (meth)acrylate, and dicyclopentenyl oxyethyl (meth)acrylate. Among the materials, in order to secure good compatibility with the additive agents, phenoxyethyl (meth)acrylate is preferred.

Among the (meth)acrylates described above, the bifunctional (meth)acrylate may include, for example, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butane diol di(meth)acrylate, 1,6-hexane diol di(meth)acrylate, 1,9-nonane diol di(meth)acrylate, neopentyl glycol di(meth)acrylate, diemethylol tricyclodecane di(meth)acrylate, EO (ethylene oxide) additive di(meth)acrylate of bisphenol A, PO (propylene oxide) additive di(meth)acrylate of bisphenol A, hydroxy pivalic acid neopentyl glycol di(meth)acrylate, and polytetramethylene glycol di(meth)acrylate. Among the materials, in order to obtain a robust coated film and to secure low viscosity, dipropylene glycol di(meth)acrylate is preferred.

Among the (meth)acrylates described above, the multifunctional (meth)acrylate such as trifunctional or higher (meth)acrylate may include, for example, trimethylol propane tri (meth)acrylate, EO modified trimethylol propane tri (meth)acrylate, pentaerythritol tri (meth)acrylate, pentaerythritol tetra(meth)acrylate, dipentaerythritol hexa (meth)acrylate, ditrimethylol propane tetra(meth)acrylate, glyceryl propoxy tri (meth)acrylate, caprolactone modified trimethylol propane tri (meth)acrylate, pentaerythritol ethoxy tetra(meth)acrylate, and caprolactam modified dipentaerythritol hexa (meth)acrylate. Among the materials, in order to obtain a robust coated film and to secure good curability, trimethylol propane tri (meth)acrylate is preferred.

In addition, among the materials, other polymerizable compounds preferably contain a monofunctional (meth)acrylate. In this case, the viscosity of the ink composition becomes low, the solubility to additive agents other than the photopolymerization initiator becomes excellent, and it is possible to obtain ejection stability during the ink jet recording period. In addition, in order to improve robustness, heat resistance, and chemical resistance of the coated film, a combination of the monofunctional (meth)acrylate and the bifunctional (meth)acrylate is more preferred.

In addition, it is preferable that the monofunctional (meth)acrylate have one or more types of skeletons selected from a group consisting of an aromatic ring skeleton, a saturated alicyclic skeleton, and a unsaturated alicyclic skeleton. By allowing the aforementioned other polymerizable compound to be the monofunctional (meth)acrylate having a skeleton, the viscosity of the ink composition may be lowered.

The monofunctional (meth)acrylate having an aromatic ring skeleton may include, for example, phenoxyethyl (meth)acrylate and 2-hydroxy-3-phenoxypropyl (meth)acrylate. In addition, the monofunctional (meth)acrylate having a saturated alicyclic skeleton may include, for example, isobornyl (meth)acrylate, t-butyl cyclohexyl (meth)acrylate and dicyclopentanyl (meth)acrylate. In addition, the monofunctional (meth)acrylate having a unsaturated alicyclic skeleton may include, for example, dicyclopentenyl oxyethyl (meth)acrylate.

Among the materials, in order to reduce the viscosity and a bad oder, at least one of phenoxyethyl (meth)acrylate and isobornyl (meth)acrylate is preferred, and the phenoxyethyl (meth)acrylate is more preferred.

In the case where the ink composition according to the embodiment contains a polymerizable compound besides the monomer A, the contained amount of the polymerizable compound preferably in a range of equal to or more than 10 wt % with respect to the total amount of the ink composition (100 wt %), more preferably in a range of equal to or more than 20 wt %. In addition, the contained amount is preferably in a range of equal to or less than 55 wt %, more preferably in a range of equal to or less than 45 wt %, furthermore preferably in a range of equal to or less than 40 wt %. In addition, particularly, in the case where the phenoxyethyl (meth)acrylate is contained as the polymerizable compound, the contained amount is preferably in a range of equal to or more than 10 wt % with respect to the total amount of the ink composition (100 wt %), more preferably in a range of equal to or more than 20 wt %. In addition, the contained amount is preferably in a range of equal to or less than 50 wt %, more preferably in a range of equal to or less than 40 wt %. As the contained amount of the phenoxyethyl (meth)acrylate is increased, the solubility of the additive agent becomes excellent, and the robustness, heat resistance, and chemical resistance of the coated film become excellent. In addition, as the contained amount of phenoxyethyl (meth)acrylate is decreased, other constituents in the ink composition may be allowed to be increased.

With respect to the aforementioned polymerizable compound, one species may be individually used, or two or more species may be simultaneously used.

Photopolymerization Initiator

The photopolymerization initiator contained in the ink composition according to the embodiment is used to perform printing by curing the ink existing on the surface of the recording medium by the photopolymerization through illumination of the ultraviolet rays. By using the ultraviolet rays (UV) among radioactive rays, it is possible to obtain excellent stability and to suppress the cost of the light source lamp.

Acylphosphine Oxide

The photopolymerization initiator according to the embodiment contains an acylphosphine oxide. Therefore, the curability of the ink becomes excellent, and the degree of initial coloration of the cured film becomes low.

The acylphosphine oxide is not particularly limited, but it may include, for example, 2,4,6-trimethyl benzoyl diphenyl phosphine oxide, 2,4,6-triethyl benzoyl diphenyl phosphine oxide, 2,4,6-tri phenyl benzoyl diphenyl phosphine oxide, bis(2,4,6-trimethyl benzoyl)phenyl phosphine oxide, and bis-(2,6-dimethoxybenzoyl)-2,4,4-trimethyl pentyl phosphine oxide.

A commercialized product of the acylphosphine oxide-based photopolymerization initiator may include, for example, DAROCUR TPO (2,4,6-trimethyl benzoyl-diphenyl-phosphine oxide), IRGACURE 819 (bis(2,4,6-trimethyl benzoyl)phenyl phosphine oxide), and CGI 403 (bis(2,6-dimethoxybenzoyl)-2,4,4-trimethyl pentyl phosphine oxide).

In addition, the aforementioned acylphosphine oxide includes a mono acylphosphine oxide. Therefore, the light curing is performed in the state where the photopolymerization initiator is sufficiently dissolved, and the curability of the ink becomes excellent.

The mono acylphosphine oxide is not particularly limited, but it may include, for example, 2,4,6-trimethyl benzoyl diphenyl phosphine oxide, 2,4,6-triethyl benzoyl diphenyl phosphine oxide, and 2,4,6-tri phenyl benzoyl diphenyl phosphine oxide. Among the materials, the 2,4,6-trimethyl benzoyl-diphenyl-phosphine oxide is preferred.

A commercialized product of the mono acylphosphine oxide-based photopolymerization initiator may include, for example, DAROCUR TPO (2,4,6-trimethyl benzoyl-diphenyl-phosphine oxide).

With respect to the photopolymerization initiator according to the embodiment, in order to secure excellent solubility to the polymerizable compound and excellent internal curability of the coated film and to reduce the degree of initial coloration, the mono acylphosphine oxide or a mixture of the mono acylphosphine oxide and the bisacylphosphine oxide is preferred.

In addition, the aforementioned bisacylphosphine oxide is not particularly limited, but it may include, for example, bis(2,4,6-trimethyl benzoyl)phenyl phosphine oxide and bis-(2,6-dimethoxybenzoyl)-2,4,4-trimethyl pentyl phosphine oxide. Among the materials, the bis(2,4,6-trimethyl benzoyl) phenyl phosphine oxide is preferred.

The contained amount of the acylphosphine oxide is in a range of 7 to 12 wt % with respect to the total amount of the ink composition (100 wt %), preferably in a range of 9 to 12 wt %, more preferably in a range of 10 to 11 wt %. If the contained amount is within this range, the curability of the ink becomes excellent, and the degree of initial coloration of the cured film becomes low.

In addition, the contained amount of the mono acylphosphine oxide is preferably in a range of equal to or more than 10 wt % with respect to the total amount (100 wt %) of the acylphosphine oxide, more preferably in a range of equal to or more than 50 wt %. If the contained amount is within this range, the curability of the ink becomes excellent, and the degree of initial coloration of the cured film becomes low.

In addition, the ink composition according to the embodiment may further contain other photopolymerization initiators besides the acylphosphine oxide. As other photopolymerization initiators, for example, an alkyl phenone-based photopolymerization initiator, a titanocene-based alkyl phenone-based photopolymerization initiator, an oxime ester-based photopolymerization initiator, an oxyphenyl acetic acid ester-based photopolymerization initiator, and the like are considered.

Polymerization Accelerator

The ink composition according to the embodiment may further contain a polymerization accelerator. The polymerization accelerator is not particularly limited, but it may include, for example, thioxanthone compounds such as thioxanthone, 2-methyl thioxanthone, 2,4-diethyl thioxanthone, 2-isopropyl thioxanthone, 2-chloro thioxanthone, and 2,4-diethyl thioxanthone and amine compounds such as triethanol amine, methyl diethanol amine, triisopropanol amine, 4,4'-dimethyl amino benzophenone, 4,4'-diethyl amino benzophenone, 2-dimethyl amino benzoic acid ethyl, 4-dimethyl amino benzoic acid ethyl, 4-dimethyl amino benzoic acid isoamyl, 4-dimethyl amino benzoic acid (n-butoxy) ethyl, 4-dimethyl amino benzoic acid 2-ethyl hexyl, and triphenyl amine.

Among the materials, in order to secure a low degree of initial coloration of the cured film, the thioxanthone compound is preferred. Among the thioxanthone compounds, in order to secure excellent sensitization effect to the acylphosphine oxide, and excellent solubility to the polymerizable compound, and excellent stability, the 2,4-diethyl thioxanthone is preferred.

A commercialized product of the thioxanthone compound may include, for example, KAYACURE DETX-S (2,4-diethyl thioxanthone) (trade name of product manufactured by NIPPON KAYAKU CO. LTD.), ITX (manufactured by BASF), and Quantacure CTX (manufactured by, ACETO CHEMICAL).

The contained amount of the thioxanthone compound is preferably in a range of 0.5 to 5 wt % with respect to the total amount of the ink composition (100 wt %), more preferably in a range of 0.5 to 4 wt %, furthermore preferably in a range of 0.5 to 2 wt %. If the contained amount is within this range, the curability of the ink becomes excellent, the degree of initial coloration of the cured film becomes low, and the color stability becomes excellent.

Coloring Material

The ink composition according to the embodiment may further contain a coloring material. With respect to the coloring material, at least one of a pigment and a dye may be used.

Pigment

In the embodiment, a pigment may be used as the coloring material, so that it is possible to improve the light resistance of the ink composition. With respect to the pigment, both of an inorganic pigment and an organic pigment may be used.

As the inorganic pigment, carbon black (C. I. Pigment Black 7) such as a furnace black, a lamp black, an acetylene black, and a channel black, iron oxide, and titanium oxide may be used.

The organic pigment may include azo pigments such as insoluble azo pigments, condensed azo pigments, azoreki, chelate azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates (for example, basic dye type chelates, acidic dye type chelates, or the like), stained lakes (basic dye type lakes, acidic dye type lakes), nitro pigments, nitroso pigments, aniline blacks, and daylight fluorescent pigments.

More specifically, the carbon black used as the black ink may include No. 2300, No. 900, MCF88, No. 33, No. 40, No. 45, No. 52, MA7, MA8, MA100, No. 2200B, and the like (trade names of products manufactured by MITSUBISHI CHEMICAL CORPORATION), Raven 5750, Raven 5250, Raven 5000, Raven 3500, Raven 1255, Raven 700, and the like (trade names of products manufactured by CARBON COLUMBIA), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (trade names of products manufactured by CABOT JAPAN K.K.), and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, and the like (trade names of products manufactured by DEGUSSA).

The pigment used as the white ink may include C. I. Pigment White 6, 18, 21.

The pigment used as the yellow ink may include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, 180.

The pigment used as the magenta ink may include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, or C. I. Pigment Violet 19, 23, 32, 33, 36, 38, 43, 50.

The pigment used as the cyan ink may include C. I. Pigment Blue 1, 2, 3, 15, 15:1, 15:2, 15:3, 15:34, 15:4, 16, 18, 22, 25, 60, 65, 66, or C. I. Vat Blue 4, 60.

In addition, the pigment excluding the magenta, cyan and yellow pigments may include, for example, C. I. Pigment Green 7, 10, C. I. Pigment Brown 3, 5, 25, 26, or C. I. Pigment Orange 1, 2, 5, 7, 13, 14, 15, 16, 24, 34, 36, 38, 40, 43, 63.

With respect to the pigment, one species may be individually used, or two or more species may be simultaneously used.

In the case where the aforementioned pigment is used, the average particle diameter is preferably equal to or less than 2 μm, more preferably in a range of 30 to 300 nm. If the average particle diameter is within the aforementioned range, reliability such as ejection stability or dispersion stability of the ink composition may become more excellent, and an image having an excellent quality of image may be formed. Herein, in the specification, the average particle diameter is measured by a dynamic light scattering method.

Dye

In the embodiment, a dye may be used as the coloring material. The dye is not particularly limited, and an acidic dye, a direct dye, a reactive dye, and a basic dye may be used. The dye may include, for example, C. I. Acid Yellow 17, 23, 42, 44, 79, 142, C. I. Acid Red 52, 80, 82, 249, 254, 289, C. I. Acid Blue 9, 45, 249, C. I. Acid Black 1, 2, 24, 94, C. I. Food Black 1, 2, C. I. Direct Yellow 1, 12, 24, 33, 50, 55, 58, 86, 132, 142, 144, 173, C. I. Direct Red 1, 4, 9, 80, 81, 225, 227, C. I. Direct Blue 1, 2, 15, 71, 86, 87, 98, 165, 199, 202, C. I. Direct Black 19, 38, 51, 71, 154, 168, 171, 195, C. I. Reactive Red 14, 32, 55, 79, 249, and C. I. Reactive Black 3, 4, 35.

With respect to the dye, one species may be individually used, or two or more species may be simultaneously used.

In order to secure good chromogenic property and to suppress the deterioration of the curing of the coated film due to the light absorption of the coloring material itself, the contained amount of the coloring material is preferably in a range of 1 to 20 wt % with respect to the total amount of the ink composition.

Dispersing Agent

In the case where the ink composition according to the embodiment contains the pigment, the ink composition may further contain a dispersing agent in order to secure good pigment dispersability. The dispersing agent is not particularly limited, but it may include, for example, a dispersing agent such as a macromolecular dispersing agent which is well used to manufacture a pigment dispersion liquid. A specific example may include one or more species of polyoxy alkylene polyalkylene polyamine, a vinyl-based polymer and a copolymer, an acryl-based polymer and a copolymer, a polyester, a polyamide, a polyimide, a poly urethane, an amino-based polymer, a silicon-containing polymer, an sulfur-containing polymer, a fluorine-containing polymer, and an epoxy resin as a main constituent. A commercialized product of the macromolecular dispersing agent may include Ajisper series (trade name) manufactured by AJINOMOTO FINE TECHNO CO., INC., Solsperse series (Solsperse 36000 or the like, trade name) available from AVECIA CO., Disperbyk series (trade name) manufactured by BYK CHEMIE, and Disperon series (trade name) manufactured by KUSUMOTO CHEMICALS CO.

Leveling Agent

The ink composition according to the embodiment may further contain a leveling agent (surfactant) in order to secure good wettability with respect a printing base material. The leveling agent is not particularly limited, but for example, as a silicon-based surfactant, polyester modified silicon or polyether modified silicon may be used. It is particularly preferable that polyether modified polydimethyl siloxane or polyester modified polydimethyl siloxane are used. A specific example may include BYK-347, BYK-348, BYK-UV3500, 3510, 3530, 3570 (trade name of product manufactured by BYK JAPAN K.K.).

Polymerization Inhibitor

The ink composition according to the embodiment may further contain a polymerization inhibitor in order to secure good preservation stability of the ink composition. The polymerization inhibitor is not particularly limited, but for example, IRGASTAB UV10 and UV22 (trade names of products manufactured by BASF), hydroquinone monomethyl ether (MEHQ, trade names of products manufactured by KANTO CHEMICAL CO., INC.) may be used.

Other Additive Agents

The ink composition according to the embodiment may contain other additive agents (constituents) besides the aforementioned additive agents. These constituents are not particularly limited, but may include, for example, a penetration enhancer, a wetting agent (humectant), and other additive agents which are well known in the related art. Other additive agents listed above may include, for example, a fixer, a fungicide, an antiseptic agent, an antioxidant, an ultraviolet ray absorber, a chelate agent, a pH adjuster, and a viscosity improver which are well known in the related art.

In addition, as described later, the ink composition according to the embodiment may be cured through illumination of ultraviolet rays of which the light emitting peak wavelength is in a range of 350 to 400 nm with an illumination energy of less than 300 mJ/cm$^2$.

Recording Medium

A recording material may be obtained by ejecting the UV curable type ink composition according to the embodiment on the recording medium by a recording method described later. The recording medium may include, for example, an absorptive recording medium or a non-absorptive recording medium. The recording method according to an embodiment described below may be applied to a variety of the recording media having various absorption performances ranging from a non-absorptive recording medium which may be easily penetrated by penetrate an aqueous ink composition thereto to an absorptive recording medium which may not be easily penetrated by an aqueous ink composition hereinto. However, in the case where the ink composition is applied to the non-absorptive recording medium, a drying process may be necessarily provided after the curing through the illumination of the ultraviolet rays.

The absorptive recording medium is not particularly limited, but it may include, for example, a plain paper such an electro-photographic paper having a high permeability of aqueous ink, ink jet paper (ink jet dedicated paper having an ink absorption layer made from silica particles or alumina particles or an ink absorption layer made from a hydrophilic polymer such as polyvinylalcohol (PVA) or polyvinylpyrrolidone (PVP)), art paper used for general offset printing having a relatively low permeability of aqueous ink, coat paper, cast paper, and the like.

The non-absorptive recording medium is not particularly limited, but it may include, for example, a plastic film or plate such as polyvinyl chloride (PVC), polyethylene, polypropylene, and polyethylene terephthalate (PET), a metal plate such as iron, silver, copper, and aluminum, a metal plate or a plastic film produced by depositing various metals, an alloy plate such as stainless steel or brass, or the like.

Recording Method

An embodiment of the invention relates to a recording method. The UV curable type ink composition according to the embodiment may be used for the recording method according to the embodiment. An ink jet type may be applied to the recording method. The recording method includes an ejection process for ejecting an ink composition on a recording medium and a curing process for curing the ink composition by illuminating the ink composition ejected by the ejection process with an ultraviolet rays. In this manner, a coated film (cured film) is formed with the ink composition cured on the recording medium.

Ejection Process

In the ejection process, the ink composition is ejected on the recording medium, and the ink composition is attached to the recording medium. At the time of ejecting the ink composition, the viscosity of the ink composition is preferably in a range of equal to or less than 15 mPa·s, more preferably in a range of 3 to 10 mPa·s. If the viscosity of an ink composition is within the aforementioned range in the state the temperature of the ink composition is set to the room temperature or the ink composition is not heated, the ink composition may be ejected in the state where the temperature of the ink composition is set to the room temperature or the ink composition is not heated. On the other hand, the viscosity of the to-be-ejected ink composition may be allowed to have a preferable viscosity by heating the ink composition at a predetermined temperature. In this manner, good ejection stability may be obtained.

Since the viscosity of radioactive ray curable type ink composition according to the embodiment is higher than that of an aqueous ink composition which is used as a general ink-jet ink, the viscosity is greatly changed according to a change in temperature at the time of ejection. The change in viscosity of the ink has much influence on a change in size of liquid droplets and a change in ejection rate of liquid droplets, and furthermore, it may lead to deterioration in quality of image. Therefore, it is preferable that the temperature of the ink at the time of ejection is maintained to be as constant as possible.

Curing Process

Next, in the curing process, the ink composition ejected and attached on the recording medium is cured through illumination of the ultraviolet rays (light). This is because the photopolymerization initiator contained in the ink composition is dissolved through illumination of the ultraviolet rays to generate initiating species such as radicals, acids, and bases and the polymerization reaction of the photopolymerizable compound is prompted by the function of the initiating species. Otherwise, this is because the polymerization reaction of the photopolymerizable compound is initiated through the illumination of the ultraviolet rays (light). At this time, if a sensitizing dye together with the photopolymerization initiator exist in the ink composition, the sensitizing dye in the system absorbs active radioactive rays to be in the excited state, and the dissolution of the photopolymerization initiator is precipitated by allowing the sensitizing dye to be in contact with the photopolymerization initiator, so that it is possible to achieve the more sensitive curing reaction.

As an ultraviolet ray source, a mercury lamp, a gas-solid laser, and the like are mainly used. As a light source used for the curing of the UV curable type ink-jet ink composition, a mercury lamp and an a metal halide lamp are widely known. On the other hand, currently, mercury-free sources are greatly preferred in terms of environmental protection, and replacement with a GaN-based semiconductor ultra violet light emitting device is very useful from industrial and environmental points of view. In addition, the ultraviolet ray light emitting diode (UV-LED) and the ultraviolet ray laser diode (UV-LD) has a small size, a long lifetime, and a high efficiency and is inexpensive, and thus, these sources are expected to be used as a UV curable type ink jet light source. Among the sources, the UV-LED is preferred.

Herein, it is preferable that a UV curable type ink composition which may be cured by using a UV-LED of which the light emitting peak wavelength is preferably in a range of 350 to 400 nm, more preferably in a range of 370 to 400 nm with an illumination energy which is preferably in a range of less than 300 mJ/cm$^2$, more preferably in a range of less than 200 mJ/cm$^2$ be used. In this case, it is possible to lower the cost and to obtain high printing speed. Such an ink composition may be obtained by containing at least one of a photopolymerization initiator which is dissolved through the ultraviolet ray illumination in the wavelength range and a polymerizable compound of which the polymerization is initiated through the ultraviolet ray illumination in the wavelength range.

In this manner, according to the two embodiment described above, it is possible to provide a UV curable type ink composition which has a low degree of initial coloration, excellent curability (curing rate) of the ink, excellent abrasion resistance of the cured film, and excellent color stability, and a recording method using the UV curable type ink composition.

In addition, with respect to the UV curable type ink composition according to the embodiment, it is possible to obtain particularly desired effect in the light curing through illumination of the ultraviolet rays of which the light emitting peak is in a range of 350 to 400 nm.

Examples

Hereinafter, although the embodiments of the first invention are described more in detail by using examples and comparative examples, the embodiments are not limited to these examples.

Constituents Used

The constituents used in the following examples and comparative examples are as follows.

Monomer A acryl acid 2-(2-vinyloxyethoxy) ethyl (VEEA[trade name], manufactured by NIPPON SHOKUBAI CO., LTD., abbreviated to VEEA in Tables 1 and 2)

Compound B dipentaerythritol hexa acrylate (A-DPH [trade name], manufactured by SHIN-NAKAMURA CHEMICAL CO., abbreviated to DPHA in Tables 1 and 2)

dipentaerythritol pentaacrylate (SR399 [trade name], manufactured by SARTOMER, abbreviated to DPPA in Tables 1 and 2)

Monofunctional (Meth)Acrylate C phenoxyethyl acrylate (Biscoat #192 [trade name], manufactured by OSAKA ORGANIC CHEMICAL INDUSTRY LTD., abbreviated to PEA in Tables 1 and 2)

benzyl acrylate (FA-BZA [trade name], manufactured by HITACHI CHEMICAL CO., abbreviated to BA in Tables 1 and 2)

isobornyl acrylate (IBXA [trade name], manufactured by OSAKA ORGANIC CHEMICAL INDUSTRY LTD., abbreviated to IBXA in Table 1)

Other Polymerizable Compounds ditrimethylol propane tetraacrylate (SR355 [trade name], manufactured by SARTOMER, abbreviated to DTMPTA in Tables 1 and 2)

trimethylol propane triacrylate (SR351S [trade name], manufactured by SARTOMER, abbreviated to TMPTA in Tables 1 and 2)

Photopolymerization Initiator

IRGACURE 819 (trade names of products manufactured by BASF, solid content 100%, abbreviated to 819 in Tables 1 and 2)

DAROCURE TPO (trade names of products manufactured by BASF, solid content 100%, abbreviated to TPO in Tables 1 and 2)

KAYACURE DETX-S (trade names of products manufactured by NIPPON KAYAKU CO., LTD., solid content 100%, abbreviated to DETX-S in Tables 1 and 2)

Slip Agent silicon-based surface conditioner BYK-UV3500 (trade names of products manufactured by BYK, abbreviated to UV3500 in Tables 1 and 2)

Polymerization Inhibitor p-methoxyphenol (MEHQ [trade name], manufactured by KANTO CHEMICAL CO., INC.)

Pigment

Pigment Blue 15:4 (IRGALITE BLUE GLVO [trade name], manufactured by BASF, abbreviated to blue 15 in Table 1)

Pigment Black 7 (carbon black) (Microlith Black C-K [trade name], manufactured by BASF)

Dispersing Agent

Solsperse 36000 (trade name of product manufactured by LUBRIZOL CORPORATION, abbreviated to Sol36000 in Tables 1 and 2)

Examples 1 to 44

The UV curable type ink-jet ink compositions of cyan (Example 1 to 26, and 44) and black (Examples 27 to 43) are obtained by adding the constituents listed in the following Tables 1 to 5 so as to have the composition (unit: wt %) and stirring the resulting products by a high-speed water cooling stirrer.

Evaluation Items

1. Curability of Thin Cured Film

The aforementioned UV curable type ink-jet ink compositions are charged in nozzle columns by using an ink jet printer PX-G5000 (trade name of product manufactured by SEIKO EPSON CORPORATION). At room temperature and atmospheric pressure, a thin film-shaped beta pattern image (recording resolution 720×720 dpi) is printed on the PET film (Lumirror 125E20 [trade name] manufactured by PANAKKU INC.) by dots of the ink of which the diameter is middle sized so that the thickness of the printed material is in a range of 0.5 to 3 μm, and the beta pattern image is cured through illumination of the ultraviolet rays having an illumination intensity of 60 mW/cm$^2$ and a wavelength of 395 nm with the illumination energy of 200 mJ/cm$^2$ from the UV-LED in the ultraviolet ray illumination apparatus installed in the side of the carriage.

In this manner, recording materials where the beta pattern image is printed on the PET film are produced. Herein, the beta pattern image denotes an image where dots are recorded with respect to all the pixels, each of which is a minimum recording unit area defined by a recording resolution.

With respect to the illumination energy [mJ/cm$^2$], the illumination intensity [mW/cm$^2$] of the illuminated surface which is illuminated with light from the light source is measured, and the illumination energy is calculated from a product of the illumination intensity and the illumination continuation time [s]. The illumination intensity is measured by using an ultraviolet ray intensity meter UM-10 and a light-receiving unit UM-400 (manufactured by KONICA MINOLTA SENSING, INC.).

The curability of the thin cured film is evaluated by using the illumination energy at the tack-free time as an indicator. Herein, it is determined based on the following conditions whether or not tack-free occurs. In other words, the occurrence of tack-free is determined based on whether or not ink is attached to a cotton swab or based on whether or not a scratch is formed on the ink cured material on the recording medium. At this time, the cotton swab used is a Johnson cotton swab manufactured by JOHNSON & JOHNSON. The scrubbing times is set to 10 as the reciprocation times, and the scrubbing strength is set to 100 g weight.

The ink coated film (cured film) at the time of evaluation of the curability is configured as a thin film having a thickness of 0.5 to 3 μm. The evaluation results are listed in the following Tables 6 to 10.

AAA: the illumination energy at the tack-free time is equal to or less than 100 mJ/cm$^2$ AA: the illumination energy at the tack-free time is more than 100 mJ/cm$^2$ and equal to or less than 200 mJ/cm$^2$ A: the illumination energy at the tack-free time is more than 200 mJ/cm$^2$ and equal to or less than 300 mJ/cm$^2$ B: the illumination energy at the tack-free time is more than 300 mJ/cm$^2$ and equal to or less than 400 mJ/cm$^2$ C: the illumination energy at the tack-free time is more than 400 mJ/cm$^2$ 2. Curability of Thick Cured Film The aforementioned UV curable type ink-jet ink compositions are charged in nozzle columns by using an ink jet printer PX-G5000 (trade name of product manufactured by SEIKO EPSON CORPORATION). At room temperature and atmospheric pressure, a thick film-shaped beta pattern image (recording resolution 720×720 dpi) is printed on the PET film (Lumirror 125E20 [trade name] manufactured by PANAKKU INC.) by dots of the ink of which the diameter is middle sized so that the thickness of the printed material is in a range of 10 to 11 μm, and the beta pattern image is cured through illumination of the ultraviolet rays having an illumination intensity of 60 mW/cm$^2$ and a wavelength of 395 nm with the illumination energy of 200 mJ/cm$^2$ from the UV-LED in the ultraviolet ray illumination apparatus installed in the side of the carriage. In an example where the tack-free state is not achieved, the illumination continues to be performed until the tack-free state is achieved.

In this manner, recording materials where the beta pattern image cured up to the tack-free state is printed on the PET film are produced. In addition, the tack-free state checking method, the beta pattern image, and the measurement and calculation of the illumination energy and the illumination intensity are the same as those described in the section "Curability of Thin Cured Film".

The curability of the thick cured film is evaluated by using an indicator indicating what a degree of the wrinkling occurs on the beta pattern image (cured film) cured up to the tack-free state. The degree of occurrence of the wrinkling is observed by visual inspection.

At the time of the curability evaluation, the thickness of the ink coated film (cured film) is set to be in a range of 10 to 11 μm as a thick film. The evaluation results are listed in the following Tables 6 to 10.

AAA: No wrinkling occurs.

AA: Wrinkle occurs in an area which is in a range of less than 5% with respect to the entire cured film.

A: Wrinkle occurs in an area which is in a range of equal to or more than 5% and equal to or less than 20% with respect to the entire cured film.

B: Wrinkle occurs in an area which is in a range of equal to or more than 20% and equal to or less than 100% with respect to the entire cured film.

C: Wrinkle occurs in the entire cured film.

3. Viscosity

The viscosity (mPa·s) of the ink composition is measured at 20° C. by using a rheometer (MCR-300, trade name of product manufactured by PHYSICA). The evaluation results are listed in the following Tables 6 to 10.

AA: equal to or more than 3 mPa·s and equal to or less than 20 mPa·s

A: more than 20 mPa·s and equal to or less than 30 mPa·s

B: more than 30 mPa·s

TABLE 1

| | Example | 1 | 2 | 3 | 4 | 5 | 6 | 7 | 8 | 9 | 10 |
|---|---|---|---|---|---|---|---|---|---|---|---|
| Monomer A | VEEA | 5.00 | 76.81 | 7.00 | 60.00 | 60.00 | 35.00 | 13.81 | 73.81 | 6.00 | 10.00 |
| Compound B | DPHA | 35.00 | 2.00 | 30.00 | 3.00 | | 32.81 | 30.00 | 5.00 | | |
| | DPPA | | | | | 5.00 | | | | 42.81 | 40.00 |
| Other Polymerizable | DTMPTA | | | | | | | | | | |
| Compound Listed Above | TMPTA | 8.81 | | 11.81 | | | | 5.00 | | | |
| | PEA | | | | | | | | | | |
| | BA | 35.00 | 5.00 | 35.00 | 20.81 | 18.81 | 16.00 | 35.00 | 5.00 | 35.00 | 33.81 |
| | IBXA | | | | | | | | | | |
| Photopolymerization Initiator | 819 | 6.00 | 6.00 | 6.00 | 6.00 | 6.00 | 6.00 | 6.00 | 6.00 | 6.00 | 6.00 |
| | TPO | 4.80 | 4.80 | 4.80 | 4.80 | 4.80 | 4.80 | 4.80 | 4.80 | 4.80 | 4.80 |
| | DETX-S | 2.00 | 2.00 | 2.00 | 2.00 | 2.00 | 2.00 | 2.00 | 2.00 | 2.00 | 2.00 |
| Slip Agent | UV3500 | 0.13 | 0.13 | 0.13 | 0.13 | 0.13 | 0.13 | 0.13 | 0.13 | 0.13 | 0.13 |
| Polymerization Inhibitor | P-methoxy phenol | 0.18 | 0.18 | 0.18 | 0.18 | 0.18 | 0.18 | 0.18 | 0.18 | 0.18 | 0.18 |
| Pigment | Blue 15 | 2.20 | 2.20 | 2.20 | 2.20 | 2.20 | 2.20 | 2.20 | 2.20 | 2.20 | 2.20 |
| | Carbon black | | | | | | | | | | |
| Dispersing Agent | Sol36000 | 0.88 | 0.88 | 0.88 | 0.88 | 0.88 | 0.88 | 0.88 | 0.88 | 0.88 | 0.88 |
| Total | | 100.00 | 100.00 | 100.00 | 100.00 | 100.00 | 100.00 | 100.00 | 100.00 | 100.00 | 100.00 |

TABLE 2

| | Example | 11 | 12 | 13 | 14 | 15 | 16 | 17 | 18 | 19 | 20 |
|---|---|---|---|---|---|---|---|---|---|---|---|
| Monomer A | VEEA | 70.81 | | 48.81 | 35.00 | 54.48 | 54.48 | 80.00 | 53.81 | 75.00 | 49.00 |
| Compound B | DPHA | | 20.00 | | | | | | 30.00 | 8.81 | |
| | DPPA | 8.00 | | | | | | | | | 34.81 |
| Other Polymerizable | DTMPTA | | | | | 12.57 | | | | | |
| Compound Listed Above | TMPTA | | 33.81 | | | | 12.57 | | | | |
| | PEA | | | 35.00 | 48.81 | 16.76 | 16.76 | 3.81 | | | |
| | BA | 5.00 | 30.00 | | | | | | | | |
| | IBXA | | | | | | | | | | |
| Photopolymerization Initiator | 819 | 6.00 | 6.00 | 6.00 | 6.00 | 6.00 | 6.00 | 6.00 | 6.00 | 6.00 | 6.00 |
| | TPO | 4.80 | 4.80 | 4.80 | 4.80 | 4.80 | 4.80 | 4.80 | 4.80 | 4.80 | 4.80 |
| | DETX-S | 2.00 | 2.00 | 2.00 | 2.00 | 2.00 | 2.00 | 2.00 | 2.00 | 2.00 | 2.00 |
| Slip Agent | UV3500 | 0.13 | 0.13 | 0.13 | 0.13 | 0.13 | 0.13 | 0.13 | 0.13 | 0.13 | 0.13 |
| Polymerization Inhibitor | P-methoxy phenol | 0.18 | 0.18 | 0.18 | 0.18 | 0.18 | 0.18 | 0.18 | 0.18 | 0.18 | 0.18 |
| Pigment | Blue 15 | 2.20 | 2.20 | 2.20 | 2.20 | 2.20 | 2.20 | 2.20 | 2.20 | 2.20 | 2.20 |
| | Carbon black | | | | | | | | | | |
| Dispersing Agent | Sol36000 | 0.88 | 0.88 | 0.88 | 0.88 | 0.88 | 0.88 | 0.88 | 0.88 | 0.88 | 0.88 |
| Total | | 100.00 | 100.00 | 100.00 | 100.00 | 100.00 | 100.00 | 100.00 | 100.00 | 100.00 | 100.00 |

TABLE 3

| | Example | 21 | 22 | 23 | 24 | 25 | 26 | 27 | 28 | 29 | 30 |
|---|---|---|---|---|---|---|---|---|---|---|---|
| Monomer A | VEEA | 75.00 | 74.00 | 35.00 | 35.00 | 10.00 | 5.00 | 77.01 | 7.00 | 60.00 | 60.00 |
| Compound B | DPHA | 5.00 | | 8.00 | | 38.81 | 35.00 | 1.28 | 30.00 | 3.00 | |
| | DPPA | | 8.00 | | 8.00 | | | | | | 5.00 |
| Other Polymerizable | DTMPTA | | | | | | | | | | |
| Compound Listed Above | TMPTA | | | | | | | 8.29 | | 11.29 | |
| | PEA | 3.81 | 1.81 | 40.81 | 40.81 | | | | | | |
| | BA | | | | | | 35.00 | 5.00 | 35.00 | 20.29 | 18.29 |
| | IBXA | | | | | 35.00 | | | | | |
| Photopolymerization Initiator | 819 | 6.00 | 6.00 | 6.00 | 6.00 | 6.00 | 6.00 | 6.00 | 6.00 | 6.00 | 6.00 |
| | TPO | 4.80 | 4.80 | 4.80 | 4.80 | 4.80 | 4.80 | 4.80 | 4.80 | 4.80 | 4.80 |
| | DETX-S | 2.00 | 2.00 | 2.00 | 2.00 | 2.00 | 3.00 | 3.00 | 3.00 | 3.00 | 3.00 |
| Slip Agent | UV3500 | 0.13 | 0.13 | 0.13 | 0.13 | 0.13 | 0.13 | 0.13 | 0.13 | 0.13 | 0.13 |
| Polymerization Inhibitor | P-methoxy phenol | 0.18 | 0.18 | 0.18 | 0.18 | 0.18 | 0.18 | 0.18 | 0.18 | 0.18 | 0.18 |
| Pigment | Blue 15 | 2.20 | 2.20 | 2.20 | 2.20 | 2.20 | | | | | |
| | Carbon black | | | | | | 2.00 | 2.00 | 2.00 | 2.00 | 2.00 |
| Dispersing Agent | Sol36000 | 0.88 | 0.88 | 0.88 | 0.88 | 0.88 | 0.60 | 0.60 | 0.60 | 0.60 | 0.60 |
| Total | | 100.00 | 100.00 | 100.00 | 100.00 | 100.00 | 100.00 | 100.00 | 100.00 | 100.00 | 100.00 |

TABLE 4

| | Example | 31 | 32 | 33 | 34 | 35 | 36 | 37 | 38 | 39 | 40 |
|---|---|---|---|---|---|---|---|---|---|---|---|
| Monomer A | VEEA | 41.00 | 13.81 | 73.29 | 5.29 | 10.00 | 70.29 | | 48.29 | 35.00 | 54.48 |
| Compound B | DPHA | 33.00 | 30.00 | 5.00 | | | | 20.00 | | | |
| | DPPA | | | | 43.00 | 39.00 | 8.00 | | | | |
| Other Polymerizable | DTMPTA | | | | | | | | | | 12.57 |
| Compound Listed Above | TMPTA | | 4.48 | | | | | 33.29 | | | |
| | PEA | | | | | | | | 35.00 | 48.29 | 16.24 |
| | BA | 9.29 | 35.00 | 5.00 | 35.00 | 34.29 | 5.00 | 30.00 | | | |
| | IBXA | | | | | | | | | | |
| Photopolymerization Initiator | 819 | 6.00 | 6.00 | 6.00 | 6.00 | 6.00 | 6.00 | 6.00 | 6.00 | 6.00 | 6.00 |
| | TPO | 4.80 | 4.80 | 4.80 | 4.80 | 4.80 | 4.80 | 4.80 | 4.80 | 4.80 | 4.80 |
| | DETX-S | 3.00 | 3.00 | 3.00 | 3.00 | 3.00 | 3.00 | 3.00 | 3.00 | 3.00 | 3.00 |
| Slip Agent | UV3500 | 0.13 | 0.13 | 0.13 | 0.13 | 0.13 | 0.13 | 0.13 | 0.13 | 0.13 | 0.13 |
| Polymerization Inhibitor | P-methoxy phenol | 0.18 | 0.18 | 0.18 | 0.18 | 0.18 | 0.18 | 0.18 | 0.18 | 0.18 | 0.18 |
| Pigment | Blue 15 | | | | | | | | | | |
| | Carbon black | 2.00 | 2.00 | 2.00 | 2.00 | 2.00 | 2.00 | 2.00 | 2.00 | 2.00 | 2.20 |
| Dispersing Agent | Sol36000 | 0.60 | 0.60 | 0.60 | 0.60 | 0.60 | 0.60 | 0.60 | 0.60 | 0.60 | 0.60 |
| Total | | 100.00 | 100.00 | 100.00 | 100.00 | 100.00 | 100.00 | 100.00 | 100.00 | 100.00 | 100.00 |

TABLE 5

| | Example | 41 | 42 | 43 | 44 | 45 | 46 | 47 | 48 | 49 |
|---|---|---|---|---|---|---|---|---|---|---|
| Monomer A | VEEA | 54.48 | 80.00 | 53.29 | 75.00 | 48.88 | 75.00 | 74.00 | 35.00 | 35.00 |
| Compound B | DPHA | | | 30.00 | 8.29 | | 5.00 | | 6.00 | |
| | DPPA | | | | | 34.41 | | 8.00 | | 8.00 |
| Other Polymerizable | DTMPTA | | | | | | | | | |
| Compound Listed Above | TMPTA | 12.57 | | | | | | | | |
| | PEA | 16.24 | 3.29 | | | | 3.29 | 1.29 | 42.29 | 40.29 |
| | BA | | | | | | | | | |
| | IBXA | | | | | | | | | |
| Photopolymerization Initiator | 819 | 6.00 | 6.00 | 6.00 | 6.00 | 6.00 | 6.00 | 6.00 | 6.00 | 6.00 |
| | TPO | 4.80 | 4.80 | 4.80 | 4.80 | 4.80 | 4.80 | 4.80 | 4.80 | 4.80 |
| | DETX-S | 3.00 | 3.00 | 3.00 | 3.00 | 3.00 | 3.00 | 3.00 | 3.00 | 3.00 |
| Slip Agent | UV3500 | 0.13 | 0.13 | 0.13 | 0.13 | 0.13 | 0.13 | 0.13 | 0.13 | 0.13 |
| Polymerization Inhibitor | P-methoxy phenol | 0.18 | 0.18 | 0.18 | 0.18 | 0.18 | 0.18 | 0.18 | 0.18 | 0.18 |
| Pigment | Blue 15 | | | | | | | | | |
| | Carbon black | 2.00 | 2.00 | 2.00 | 2.00 | 2.00 | 2.00 | 2.00 | 2.00 | 2.00 |
| Dispersing Agent | Sol36000 | 0.60 | 0.60 | 0.60 | 0.60 | 0.60 | 0.60 | 0.60 | 0.60 | 0.60 |
| Total | | 100.00 | 100.00 | 100.00 | 100.00 | 100.00 | 100.00 | 100.00 | 100.00 | 100.00 |

TABLE 6

| | Example | 1 | 2 | 3 | 4 | 5 | 6 | 7 | 8 | 9 | 10 |
|---|---|---|---|---|---|---|---|---|---|---|---|
| Evaluation Test | Curability (Thin Film) | AA | AA | AA | A | A | AAA | AAA | AAA | AA | AAA |
| | Curability (Thick Film) | AAA | AA | AA | AA | AA | AAA | AAA | AAA | AAA | AAA |
| | Viscosity | A | AA | A | AA | AA | A | AA | AA | A | AA |

TABLE 7

| | Example | 11 | 12 | 13 | 14 | 15 | 16 | 17 | 18 | 19 | 20 |
|---|---|---|---|---|---|---|---|---|---|---|---|
| Evaluation Test | Curability (Thin Film) | AAA | C | C | C | C | C | C | C | C | C |
| | Curability (Thick Film) | AAA | A | C | C | B | B | C | B | B | B |
| | Viscosity | AA | B | AA | AA | A | A | AA | B | AA | B |

TABLE 8

| | Example | 21 | 22 | 23 | 24 | 25 | 26 | 27 | 28 | 29 | 30 |
|---|---|---|---|---|---|---|---|---|---|---|---|
| Evaluation Test | Curability (Thin Film) | B | C | C | C | C | AA | AA | AA | A | A |
| | Curability (Thick Film) | A | B | B | B | B | AAA | AA | AA | AA | AA |
| | Viscosity | AA | AA | AA | AA | B | A | AA | A | AA | AA |

TABLE 9

| Example | | 31 | 32 | 33 | 34 | 35 | 36 | 37 | 38 | 39 | 40 |
|---|---|---|---|---|---|---|---|---|---|---|---|
| Evaluation Test | Curability (Thin Film) | AAA | AAA | AAA | AA | AAA | AAA | C | C | C | C |
| | Curability (Thick Film) | AAA | AAA | AAA | AAA | AAA | AAA | A | C | C | B |
| | Viscosity | A | AA | AA | A | AA | AA | B | AA | AA | A |

TABLE 10

| Example | | 41 | 42 | 43 | 44 | 45 | 46 | 47 | 48 | 49 |
|---|---|---|---|---|---|---|---|---|---|---|
| Evaluation Test | Curability (Thin Film) | C | C | C | C | C | B | C | C | C |
| | Curability (Thick Film) | B | C | B | B | B | A | B | B | B |
| | Viscosity | A | AA | B | AA | B | AA | AA | AA | AA |

It may be clearly understood from Tables 6 to 10 described above that, the ink compositions (Examples 1 to 11 and 26 to 36) containing at least one of the VEEA which is one monomer A and the monofunctional (meth)acrylate having an aromatic ring skeleton in which the contained amount is in a range of 5 to 35 wt % in the ink compositions are particularly excellent in terms of the curability of a thin film in comparison with other ink compositions, and are excellent in terms of the curability of a thick film and viscosity.

In addition, it may be understood that the ink compositions containing the compound B are excellent in terms of, particularly, a thick cured film in comparison with the ink compositions containing no compound B.

In addition, it may be clearly understood that, among the ink compositions which are excellent in terms described above, the ink compositions where dipentaerythritol hexa acrylate which is in a range of 5 to 30 wt % with respect to the total weight of the ink composition is contained as the compound B are excellent in terms of at least one of the curability of a thin cured film and the viscosity in comparison with the ink compositions where the material outside the above range is contained.

In addition, it may be clearly understood that, among the ink compositions which are excellent in terms described above, the ink compositions where dipentaerythritol pentaacrylate which is in a range of 8 to 40 wt % with respect to the total weight of the ink composition is contained as the compound B are further excellent in terms of both of the curability of a thin cured film and the viscosity in comparison with the ink compositions where the material outside the above range is contained.

In addition, it may be clearly understood that, among the ink compositions which are excellent in terms described above, the ink compositions containing VEEA which is one monomer A which is in a range of equal to or less than 75 wt % with respect to the total weight of the ink composition are particularly excellent in terms of the curability of a thin cured film, and the ink compositions containing VEEA which is one monomer A which is in a range of equal to or more than 10 wt % with respect to the total weight of the ink composition are particularly excellent in terms of the low viscosity.

In addition, with respect to the ink compositions where at least one of the phenoxyethyl acrylate and the benzyl acrylate which are the monofunctional (meth)acrylates having an aromatic ring skeleton is not contained in an amount which is in a range of equal to or more than 5 wt % with respect to the ink composition, the solubility of the photopolymerization initiator is in poor, and a long time is necessarily taken to dissolve the photopolymerization initiator. It may be considered that the reason why these Examples deteriorate in the curability of a thin film is that the photopolymerization initiator is not sufficiently dissolved and the photopolymerization initiator may not sufficiently contribute to the curability. In addition, it is considered that, although the ink compositions of these Examples contain the compound B, the ink compositions of these Examples slightly deteriorate in the curability of a thick film in comparison with Examples other than the above Examples, and the photopolymerization initiator may not sufficiently contribute to the curability, so that the ink compositions of these Examples deteriorate in the curability of a thick film.

In addition, the same evaluation as the evaluation of the curability with respect to the aforementioned curability of a thick film is performed except that the same ink compositions as those of Examples 1 and 17 described above and the illumination is performed by using a metal halide lamp instead of the UV-LED. In the case where the same ink composition as that of Example 1 is used, the curability of a thick film is AAA, and in the case where the same ink composition as that of Example 17 is used, the curability of a thick film is A, but deformation occurs in the recording medium due to heat released from the metal halide lamp. It may be understood from these results that, the ink compositions containing at least one of the VEEA which is one monomer A and the monofunctional (meth)acrylate having an aromatic ring skeleton in which the contained amount is in a range of 5 to 35 wt % in the ink compositions and the compound B are good in terms of the curability of a thick film even in the case where any type of light source is used in comparison with the ink compositions which do not satisfy all the above conditions. Particularly, it may be understood that, even in the case where the ink compositions are cured by using UV-LED for which the released heat is small, the curability of a thick film become good.

Hereinafter, the embodiment of the second inversion will be specifically described by using Examples and Comparative Examples, but the embodiment is not limited to the Examples.

Constituents Used

The constituents used in Examples and Comparative Examples described below are as follows.

Polymerizable Compound acryl acid 2-(2-vinyloxyethoxy) ethyl (VEEA, trade name of product manufactured by NIPPON SHOKUBAI CO. Ltd., abbreviated to VEEA in Tables)

dipropylene glycol diacrylate (APG-100, trade name of product manufactured by SHIN-NAKAMURA CHEMICAL CO. LTD., abbreviated to DPGDA in Tables)

trimethylol propane triacrylate (A-TMPT, trade name of product manufactured by SHIN-NAKAMURA CHEMICAL CO. LTD., abbreviated to TMPTA in Tables)

phenoxyethyl acrylate Biscoat #192 (trade name of product manufactured by OSAKA ORGANIC CHEMICAL INDUSTRY LTD., abbreviated to PEA in Tables)

Photopolymerization Initiator

IRGACURE 819 (trade name of product manufactured by BASF, abbreviated to 819 in Tables)

DAROCUR TPO (trade name of product manufactured by BASF, abbreviated to TPO in Tables)

IRGACURE 907 (trade name of product manufactured by BASF, abbreviated to 907 in Tables)

IRGACURE 369 (trade name of product manufactured by BASF, abbreviated to 369 in Tables)

IRGACURE 1870 (trade name of product manufactured by BASF, abbreviated to 1870 in Tables)

Polymerization Accelerator

KAYACURE DETX-S (trade name of product manufactured by NIPPON KAYAKU CO., LTD., abbreviated to DETX-S in Tables)

Pigment

IRGALITE BLUE GLVO (color index name: pigment blue 15:4, trade name of product manufactured by BASF, abbreviated to cyan in Tables)

CROMOPHTAL PinkPT (SA) GLVO (color index name: C. I. Pigment Red 122, trade name of product manufactured by BASF, abbreviated to magenta in Tables)

IRGALITE YELLOW LBG (color index name: C. I. Pigment Yellow 13, trade name of product manufactured by BASF, abbreviated to yellow in Tables)

MICROLITH-WA Black C-WA (color index name: C. I. Pigment Black 7, trade name of product manufactured by BASF, abbreviated to black in Tables)

Dispersing Agent

Solsperse 36000 (trade name of product manufactured by LUBRIZOL CORPORATION, abbreviated to Sol36000 in Tables)

Leveling Agent silicon-based surface conditioner BYK-UV3500 (trade name of product manufactured by BYK, abbreviated to UV3500 in Tables)

Polymerization Inhibitor

MEHQ (trade name of product manufactured by KANTO CHEMICAL CO., INC., abbreviated to MEHQ in Tables)

Examples 1 to 18 and Comparative Examples 1 to 15

The UV curable type ink compositions of colors (cyan, magenta, yellow, and black) are obtained by adding the constituents listed in the following Tables so as to have the composition (unit: wt %) listed in the Tables and stirring the resulting products by a high-speed water cooling stirrer.

TABLE 11

| | | Example | | | | | | |
|---|---|---|---|---|---|---|---|---|
| | | 1 | 2 | 3 | 4 | 5 | 6 | 7 |
| Polymerizable Compound | VEEA | 40 | 60 | 80 | 90 | 40 | 40 | 40 |
| | DPGDA | 0.5 | 0.5 | — | — | 0.5 | 0.5 | 0.5 |
| | TMPTA | — | — | — | — | — | — | — |
| | PEA | 40 | 20 | 10 | 2.2 | 40 | 40 | 40 |
| Photopolymerization Initiator | 819 | 6 | 6 | 3 | — | 6 | 6 | 6 |
| | TPO | 6 | 6 | 4 | 7 | 6 | 6 | 6 |
| | 907 | — | — | — | — | — | — | — |
| | 369 | — | — | — | — | — | — | — |
| | 1870 | — | — | — | — | — | — | — |
| Total Amount of Photopolymerization Initiator | | 12 | 12 | 7 | 7 | 12 | 12 | 12 |
| Polymerization Accelerator | DETX-S | 5 | 5 | 0.5 | 0.5 | 5 | 5 | 5 |
| Pigment | Cyan | 2 | 2 | 2 | — | — | — | — |
| | Magenta | — | — | — | — | 2 | — | — |
| | Yellow | — | — | — | — | — | 2 | — |
| | Black | — | — | — | — | — | — | 2 |
| Dispersing Agent | Sol36000 | 0.2 | 0.2 | 0.2 | — | 0.2 | 0.2 | 0.2 |
| Leveling Agent | UV3500 | 0.1 | 0.1 | 0.1 | 0.1 | 0.1 | 0.1 | 0.1 |
| Polymerization Inhibitor | MEHQ | 0.2 | 0.2 | 0.2 | 0.2 | 0.2 | 0.2 | 0.2 |
| Total | | 100 | 100 | 100 | 100 | 100 | 100 | 100 |

TABLE 12

| | | Example | | | | | | | | | | |
|---|---|---|---|---|---|---|---|---|---|---|---|---|
| | | 8 | 9 | 10 | 11 | 12 | 13 | 14 | 15 | 16 | 17 | 18 |
| Polymerizable Compound | VEEA | 40 | 40 | 40 | 40 | 40 | 40 | 40 | 40 | 40 | 40 | 40 |
| | DPGDA | 0.5 | 0.5 | 0.5 | — | — | 0.5 | — | — | 0.5 | — | 0.5 |
| | TMPTA | — | — | — | — | — | — | — | — | — | — | — |
| | PEA | 50 | 50 | 50 | 45.5 | 45.5 | 50 | 50 | 49.5 | 45 | 45 | 39 |
| Photopolymerization Initiator | 819 | — | 1 | 6 | 6 | — | — | — | — | — | 6 | 6 |
| | TPO | 7 | 6 | 1 | 6 | 12 | 7 | 7 | 7 | 7 | 6 | 6 |
| | 907 | — | — | — | — | — | — | — | — | — | — | — |

TABLE 12-continued

|  |  | Example | | | | | | | | | | |
|---|---|---|---|---|---|---|---|---|---|---|---|---|
|  |  | 8 | 9 | 10 | 11 | 12 | 13 | 14 | 15 | 16 | 17 | 18 |
|  | 369 | — | — | — | — | — | — | — | — | — | — | — |
|  | 1870 | — | — | — | — | — | — | — | — | — | — | — |
| Total Amount of Photopolymerization Initiator |  | 7 | 7 | 7 | 12 | 12 | 7 | 7 | 7 | 7 | 12 | 12 |
| Polymerization Accelerator | DETX-S | — | — | — | — | — | — | 0.5 | 1 | 5 | 0.5 | 6 |
| Pigment | Cyan | 2 | 2 | 2 | 2 | 2 | 2 | 2 | 2 | 2 | 2 | 2 |
|  | Magenta | — | — | — | — | — | — | — | — | — | — | — |
|  | Yellow | — | — | — | — | — | — | — | — | — | — | — |
|  | Black | — | — | — | — | — | — | — | — | — | — | — |
| Dispersing Agent | Sol36000 | 0.2 | 0.2 | 0.2 | 0.2 | 0.2 | 0.2 | 0.2 | 0.2 | 0.2 | 0.2 | 0.2 |
| Leveling Agent | UV3500 | 0.1 | 0.1 | 0.1 | 0.1 | 0.1 | 0.1 | 0.1 | 0.1 | 0.1 | 0.1 | 0.1 |
| Polymerization Inhibitor | MEHQ | 0.2 | 0.2 | 0.2 | 0.2 | 0.2 | 0.2 | 0.2 | 0.2 | 0.2 | 0.2 | 0.2 |
| Total |  | 100 | 100 | 100 | 100 | 100 | 100 | 100 | 100 | 100 | 100 | 100 |

TABLE 13

|  |  | Comparative Example | | | | | | |
|---|---|---|---|---|---|---|---|---|
|  |  | 1 | 2 | 3 | 4 | 5 | 6 | 7 |
| Polymerizable Compound | VEEA | — | — | — | — | — | 36 | 92 |
|  | DPGDA | 40.5 | — | 80.5 | — | 0.5 | 0.5 | — |
|  | TMPTA | — | 40.5 | — | 80.5 | — | — | — |
|  | PEA | 40 | 40 | — | — | 80 | 44 | — |
| Photopolymerization Initiator | 819 | 6 | 6 | 6 | 6 | 6 | 6 | — |
|  | TPO | 6 | 6 | 6 | 6 | 6 | 6 | 5 |
|  | 907 | — | — | — | — | — | — | — |
|  | 369 | — | — | — | — | — | — | — |
|  | 1870 | — | — | — | — | — | — | — |
| Total Amount of Photopolymerization Initiator |  | 12 | 12 | 12 | 12 | 12 | 12 | 5 |
| Polymerization Accelerator | DETX-S | 5 | 5 | 5 | 5 | 5 | 5 | 0.5 |
| Pigment | Cyan | 2 | 2 | 2 | 2 | 2 | 2 | 2 |
|  | Magenta | — | — | — | — | — | — | — |
|  | Yellow | — | — | — | — | — | — | — |
|  | Black | — | — | — | — | — | — | — |
| Dispersing Agent | Sol36000 | 0.2 | 0.2 | 0.2 | 0.2 | 0.2 | 0.2 | 0.2 |
| Leveling Agent | UV3500 | 0.1 | 0.1 | 0.1 | 0.1 | 0.1 | 0.1 | 0.1 |
| Polymerization Inhibitor | MEHQ | 0.2 | 0.2 | 0.2 | 0.2 | 0.2 | 0.2 | 0.2 |
| Total |  | 100 | 100 | 100 | 100 | 100 | 100 | 100 |

TABLE 14

|  |  | Comparative Example | | | | | | | |
|---|---|---|---|---|---|---|---|---|---|
|  |  | 8 | 9 | 10 | 11 | 12 | 13 | 14 | 15 |
| Polymerizable Compound | VEEA | 40 | 40 | 40 | 40 | 40 | 40 | 40 | 40 |
|  | DPGDA | 0.5 | 0.5 | 0.5 | — | 0.5 | 0.5 | 0.5 | 0.5 |
|  | TMPTA | — | — | — | — | — | — | — | — |
|  | PEA | 50 | 51 | 51 | 44.5 | 44 | 50 | 50 | 50 |
| Photopolymerization Initiator | 819 | 7 | 6 | — | — | 6 | — | — | — |
|  | TPO | — | — | 6 | 13 | 7 | — | — | — |
|  | 907 | — | — | — | — | — | 7 | — | — |
|  | 369 | — | — | — | — | — | — | 7 | — |
|  | 1870 | — | — | — | — | — | — | — | 7 |
| Total Amount of Photopolymerization Initiator |  | 7 | 6 | 6 | 13 | 7 | 7 | 7 | 7 |
| Polymerization Accelerator | DETX-S | — | — | — | — | — | — | — | — |
| Pigment | Cyan | 2 | 2 | 2 | 2 | 2 | 2 | 2 | 2 |
|  | Magenta | — | — | — | — | — | — | — | — |
|  | Yellow | — | — | — | — | — | — | — | — |
|  | Black | — | — | — | — | — | — | — | — |

TABLE 14-continued

|  |  | Comparative Example | | | | | | | |
|---|---|---|---|---|---|---|---|---|---|
|  |  | 8 | 9 | 10 | 11 | 12 | 13 | 14 | 15 |
| Dispersing Agent | Sol36000 | 0.2 | 0.2 | 0.2 | 0.2 | 0.2 | 0.2 | 0.2 | 0.2 |
| Leveling Agent | UV3500 | 0.1 | 0.1 | 0.1 | 0.1 | 0.1 | 0.1 | 0.1 | 0.1 |
| Polymerization Inhibitor | MEHQ | 0.2 | 0.2 | 0.2 | 0.2 | 0.2 | 0.2 | 0.2 | 0.2 |
| Total |  | 100 | 100 | 100 | 100 | 100 | 100 | 100 | 100 |

Evaluation Items

1. Curability of Ink

First, the UV curable type ink compositions obtained in Examples 1 to 18 and Comparative Examples 1 to 15 are beta-printed on the PET film (resolution 720 dpi×720 dpi) by using a printer (Product Number PX-G5000, manufactured by SEIKO EPSON CORPORATION). The beta printing is a printing where ink is attached to all the pixels each of which is the minimum unit of printing defined by a resolution.

Next, an image is formed (a recording material is obtained) by illuminating the PET film after the beta printing with the ultraviolet rays (center wavelength 395 nm, 300 mW/cm$^2$) by using the ultraviolet ray illumination apparatus (prototype product of inventor's company) where an LED is installed.

With respect to the accumulated light amount (illumination energy) [mJ/cm$^2$], the illumination intensity [mW/cm$^2$] of the illuminated surface which is illuminated with light from the light source is measured, and the accumulated light amount (illumination energy) is calculated from a product of the illumination intensity and the illumination continuation time [s]. The illumination intensity is measured by using an ultraviolet ray intensity meter UM-10 and a light-receiving unit UM-400 (both are manufactured by KONICA MINOLTA SENSING, INC.).

In addition, it is determined based on the following conditions whether or not tack-free occurs. In other words, the occurrence of tack-free is determined based on whether or not ink is attached to a cotton swab or based on whether or not a scratch is formed on the ink cured material on the recording medium. At this time, the cotton swab used is a Johnson cotton swab manufactured by JOHNSON & JOHNSON. The scrubbing times is set to 10 as the reciprocation times, and the scrubbing strength is set to 100 g weight. In addition, the ink coated film (cured film) at the time of evaluation of the curability is configured to have a thickness of 2 μm.

The evaluation standards are as follows. Among the evaluation standards, the standards AA, A, and B are practically allowable. The evaluation results are listed in the following tables.

AA: the accumulated light amount at the tack-free time is less than 150 mJ/cm$^2$.
A: the accumulated light amount at the tack-free time is equal to or more than 150 mJ/cm$^2$ and less than 200 mJ/cm$^2$.
B: the accumulated light amount at the tack-free time is equal to or more than 200 mJ/cm$^2$ and less than 300 mJ/cm$^2$.
C: the accumulated light amount at the tack-free time is equal to or more than 300 mJ/cm$^2$ and less than 400 mJ/cm$^2$.
D: the accumulated light amount at the tack-free time is equal to or more than 400 mJ/cm$^2$.

2. Abrasion Resistance of Cured Film

After the obtained recording materials are maintained at 20° C. for 16 hours, under the conditions where the weight is 500 g weight and scrubbing times is 100, a scrubber attached with a white cotton cloth (Canequium 3) for scrubbing and the recording material are scrubbed by using a JSPS-type friction tester robust tester AB-301 (manufactured by TESTER SANGYO CO.), and the surface state of the image is observed by visual inspection.

The evaluation standards are as follows. Among the evaluation standards, the standards AA, A, and B are practically allowable. The evaluation results are listed in the following tables.

AA: No scratch occurs on the surface of the image.
A: Scratch occurs in less than 5 sites on the surface of the image.
B: Scratch occurs in equal to or more than 5 sites and equal to or less than 10 sites on the surface of the image.
C: Scratch occurs in half of the surface of the image.
D: Scratch occurs in almost the entire surface of the image.

3. Degree of Initial Coloration of Cured Film

With respect to the color of the obtained recording materials, colorimetry is performed by using the CIE Lab (L*a*b* colorimetric system). By using the color of the recording material (image) obtained from the ink composition disclosed in Example 4 as a reference, the color differences (ΔE) are obtained from the following equation. The colorimetry is performed on the recording materials after one hour elapses from the printing.

$$\Delta E = (\Delta a^{*2} + \Delta b^{*2} + \Delta L^{*2})^{(1/2)}$$

In addition, in Examples 5, 6, and 7, the color differences ΔE are obtained from the color of the recording materials obtained from the ink compositions (not indicated as Example) which are produced by substituting a magenta pigment, a yellow pigment, and a block pigment for the cyan pigment in the ink composition disclosed in Example 4.

The evaluation standards are as follows. Among the evaluation standards, the standards AA, A, and B are practically allowable. The evaluation results are listed in the following tables.

AA: ΔE is less than 1.0.
A: ΔE is equal to or more than 1.0 and less than 1.5.
B: ΔE is equal to or more than 1.5 and less than 2.0.
C: ΔE is equal to or more than 2.0 and less than 2.5.
D: ΔE is equal to or more than 2.5.

4. Color Stability of Cured Film

With respect to the color of the recording materials obtained above, colorimetry is performed by using the CIE Lab (L*a*b* colorimetric system). More specifically, the colorimetry is performed on the recording materials which are left to stand for 24 hours after the printing, and the differences (ΔE) with respect to the color of the recording material just after the printing (that is, the initial recording material) are obtained from the following equation.

$$\Delta E = (\Delta a^{*2} + \Delta b^{*2} + \Delta L^{*2})^{(1/2)}$$

The evaluation standards are as follows. Among the evaluation standards, the standards AA, A, and B are practically allowable. The evaluation results are listed in the following tables.

AA: ΔE is less than 1.0.
A: ΔE is equal to or more than 1.0 and less than 1.5.
B: ΔE is equal to or more than 1.5 and less than 2.0.
C: ΔE is equal to or more than 2.0 and less than 2.5.
D: ΔE is equal to or more than 2.5.

TABLE 15

| Evaluation Test | Example | | | | | | |
|---|---|---|---|---|---|---|---|
| | 1 | 2 | 3 | 4 | 5 | 6 | 7 |
| Curability | AA | AA | A | B | A | A | A |
| Abrasion Resistance | B | A | AA | AA | B | B | B |
| Degree of Initial Coloration | A | A | A | AA | A | A | A |
| Color Stability | A | A | AA | AA | A | A | A |

TABLE 16

| Evaluation Test | Example | | | | | | | | | | |
|---|---|---|---|---|---|---|---|---|---|---|---|
| | 8 | 9 | 10 | 11 | 12 | 13 | 14 | 15 | 16 | 17 | 18 |
| Curability | B | B | B | A | A | B | B | B | AA | AA | AA |
| Abrasion Resistance | B | B | B | B | B | B | B | B | B | B | B |
| Degree of Initial Coloration | A | A | A | B | B | A | AA | AA | AA | A | A |
| Color Stability | AA | AA | AA | AA | AA | AA | AA | AA | A | AA | B |

TABLE 17

| Evaluation Test | Comparative Example | | | | | | |
|---|---|---|---|---|---|---|---|
| | 1 | 2 | 3 | 4 | 5 | 6 | 7 |
| Curability | C | C | D | C | C | B | C |
| Abrasion Resistance | B | B | A | A | D | C | A |
| Degree of Initial Coloration | A | A | A | A | A | A | A |
| Color Stability | A | A | A | A | A | A | AA |

TABLE 18

| Evaluation Test | Comparative Example | | | | | | | |
|---|---|---|---|---|---|---|---|---|
| | 8 | 9 | 10 | 11 | 12 | 13 | 14 | 15 |
| Curability | C | C | C | A | A | C | D | C |
| Abrasion Resistance | B | B | B | B | B | B | B | B |
| Degree of Initial Coloration | A | A | A | C | C | D | D | C |
| Color Stability | AA | AA | AA | AA | AA | C | C | A |

In the above tables, the ink compositions of Comparative Examples 3 and 4 are not preferable because the solubility of the photopolymerization initiator is poor so that long time is taken to dissolve the ink compositions.

It may be clearly understood from the above tables that the UV curable type ink compositions where the polymerizable compound contains a predetermined amount of VEEA, the photopolymerization initiator contains a predetermined amount of acylphosphine oxide, and the acylphosphine oxide contains mono acylphosphine oxide have excellent curability, a low degree of initial coloration of the cured film, and excellent abrasion resistance and color stability of the cured film. Among the UV curable type ink compositions described above, it may be clearly understood by referring to Examples 13 to 18 that the UV curable type ink compositions where the thioxanthone compound which is in a range of 0.5 to 5 wt % is contained as the polymerization accelerator are very excellent in terms of the curability, the a low degree of initial coloration of the cured film, and the color stability.

What is claimed is:
1. A UV curable type ink-jet ink composition containing a monomer A which is expressed by the following general formula (I):

$$CH_2=CR^1-COOR^2-O-CH=CH-R^3 \quad (I)$$

(in the formula, $R^1$ is a hydrogen atom or methyl radical, $R^2$ is a bivalent organic residue radical having a carbon number in a range of 2 to 20, and $R^3$ is a hydrogen atom or a univalent organic residue radical having a carbon number in a range of 1 to 11),
a compound B containing five or more (meth) acryloyl radicals per molecule, and
a monofunctional (meth)acrylate C having an aromatic ring skeleton,
wherein the monofunctional (meth)acrylate C which is in a range of 5 to 35 wt % with respect to the total weight of the ink composition is contained,
wherein the compound B is in a range of 5 to 40 wt % with respect to the total of the ink composition,
wherein the monomer A is in a range of 10 to 70% with respect to the total weight of the ink composition.
2. The UV curable type ink-jet ink composition according to claim 1, wherein the monomer A is (meth)acrylic acid 2-(vinyloxyethoxy)ethyl.
3. The UV curable type ink-jet ink composition according to claim 1, wherein the compound B contains at least one of a hexa (meth)acrylate compound having six (meth) acryloyl radicals per molecule and a penta(meth)acrylate compound having five (meth) acryloyl radicals per molecule.
4. The UV curable type ink-jet ink composition according to claim 1, wherein the compound B contain a (meth)acrylate having a dipentaerythritol skeleton.
5. The UV curable type ink-jet ink composition according to claim 3, wherein the compound B contains a dipentaerythritol hexa (meth)acrylate or a dipentaerythritol penta (meth)acrylate.
6. The UV curable type ink-jet ink composition according to claim 1, wherein the monofunctional (meth)acrylate C having an aromatic ring skeleton is at least one of a benzyl (meth)acrylate and a phenoxyethyl (meth)acrylate.
7. The UV curable type ink-jet ink composition according to claim 1, wherein an acylphosphine oxide compound is contained as the photopolymerization initiator.
8. The UV curable type ink-jet ink composition according to claim 7, wherein an acylphosphine oxide compound which is in a range of 7 to 15 wt % with respect to the total weight of the ink composition is contained as the photopolymerization initiator.
9. The UV curable type ink-jet ink composition according to claim 1, wherein the curing is performed through illumination of ultraviolet rays of which the light emitting peak wavelength is in a range of 350 to 420 nm with an illumination energy of equal to or less than 300 mJ/cm$^2$.

10. The UV curable type ink-jet ink composition according to claim 1, wherein viscosity at 20° C. is in a range of 3 to 30 mPa·s.

11. The UV curable type ink-jet ink composition according to claim 1, wherein the curing is performed in a state of a thin film having a thickness of 0.5 to 3 μm.

12. An ink jet recording method of ejecting the UV curable type ink-jet ink composition according to claim 1 on a recording medium and curing the ejected UV curable type ink-jet ink composition through illumination using a UV-LED of which the light emitting peak wavelength is in a range of 350 to 420 nm.

13. An ink jet recording apparatus for ejecting the UV curable type ink-jet ink composition according to claim 1 on a recording medium and curing the ejected UV curable type ink-jet ink composition through illumination using a UV-LED of which the light emitting peak wavelength is in a range of 350 to 420 nm.

14. The UV curable type ink-jet ink composition according to claim 1, wherein the monomer A is present in a range of 10 to 41 wt. % with respect to the total weight of the ink composition.

15. The UV curable type ink-jet ink composition according to claim 1, wherein the monomer B is present in a range of 5 to 30 wt. % with respect to the total weight of the ink composition.

\* \* \* \* \*